(12) United States Patent
Nakano et al.

(10) Patent No.: US 10,454,140 B2
(45) Date of Patent: Oct. 22, 2019

(54) ELECTRODE BODY FOR USE IN NON-AQUEOUS ELECTROLYTE SECONDARY BATTERY AND NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Tomohiro Nakano, Okazaki (JP); Hideaki Fujita, Kyotanabe (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 15/833,567

(22) Filed: Dec. 6, 2017

(65) Prior Publication Data

US 2018/0097254 A1 Apr. 5, 2018

Related U.S. Application Data

(60) Division of application No. 14/551,853, filed on Nov. 24, 2014, now abandoned, which is a division of
(Continued)

(51) Int. Cl.
*H01M 10/058* (2010.01)
*H01M 2/18* (2006.01)
*H01M 4/13* (2010.01)

(52) U.S. Cl.
CPC ........... *H01M 10/058* (2013.01); *H01M 2/18* (2013.01); *H01M 4/13* (2013.01)

(58) Field of Classification Search
None
See application file for complete search history.

(56) References Cited

U.S. PATENT DOCUMENTS 6,335,114 B1 * 1/2002 Ueshima ............. H01M 2/0285
429/161
2004/0180259 A1 9/2004 Kim et al.
(Continued)

FOREIGN PATENT DOCUMENTS

JP 1-122574 5/1989
JP 6-150900 5/1994
(Continued)

*Primary Examiner* — Basia A Ridley
*Assistant Examiner* — Heng M. Chan
(74) *Attorney, Agent, or Firm* — Finnegan, Henderson, Farabow, Garrett & Dunner, LLP

(57) ABSTRACT

In an electrode body for use in non-aqueous electrolyte secondary battery, a first end of a separator is located more interiorly than one positive electrode end of a positive electrode plate in a width direction, located more exteriorly than one end of a coated positive electrode portion of the positive electrode plate, and located more exteriorly than one end of a coated negative electrode portion of a negative electrode plate. The first end of the separator is thicker than an intermediate portion. A second end of the separator is located more interiorly than an other negative electrode end of the negative electrode plate in the width direction, located more exteriorly than the other end of the coated positive electrode portion of the positive electrode plate, and located more exteriorly than an other end of the coated negative electrode portion of the negative electrode plate. The second end of the separator is thicker than the intermediate portion.

4 Claims, 14 Drawing Sheets

Related U.S. Application Data application No. 13/106,917, filed on May 13, 2011, now abandoned, which is a continuation of application No. PCT/JP2010/051718, filed on Feb. 5, 2010.

(56) References Cited

U.S. PATENT DOCUMENTS

| | | | |
|---|---|---|---|
| 2008/0107961 | A1 | 5/2008 | Jeong et al. |
| 2011/0129722 | A1* | 6/2011 | Yoneda ............... H01M 4/661 |
| | | | 429/162 |

FOREIGN PATENT DOCUMENTS

| | | |
|---|---|---|
| JP | 9-306513 | 11/1997 |
| JP | 2000-277062 | 10/2000 |
| JP | 2001-185120 | 7/2001 |
| JP | 2003-242955 | 8/2003 |
| JP | 2004-95382 | 3/2004 |
| JP | 2005-190913 | 7/2005 |
| JP | 2006-278245 | 10/2006 |
| JP | 2007-53055 | 3/2007 |
| JP | 2007-141482 | 6/2007 |
| JP | 2008-27867 | 2/2008 |
| JP | 2008-84567 | 4/2008 |
| JP | 2009-32408 | 2/2009 |
| JP | 2009-54480 | 3/2009 |
| JP | 2009-238487 | 10/2009 |
| WO | WO-2010004927 A1 * | 1/2010 ............ H01M 4/661 |

* cited by examiner

ELECTRODE BODY FOR USE IN NON-AQUEOUS ELECTROLYTE SECONDARY BATTERY AND NON-AQUEOUS ELECTROLYTE SECONDARY BATTERY

CROSS-REFERENCE TO RELATED APPLICATIONS

This application is a division of U.S. application Ser. No. 14/551,853 filed on Nov. 24, 2014, which is a division of U.S. application Ser. No. 13/103,917, filed on May 13, 2011, which is a continuation application based upon and claims the benefit of the prior PCT International Patent Application No. PCT/JP2010/051718 filed on Feb. 5, 2010, each of which is incorporated herein by reference.

TECHNICAL FIELD

The present invention relates to an electrode body for use in non-aqueous electrolyte secondary battery and a non-aqueous electrolyte secondary battery using the electrode body.

BACKGROUND ART

Non-aqueous electrolyte secondary batteries such as lithium ion secondary batteries have gained considerable interest as electric power sources for portable devices and as electric power sources for driving vehicles such as electric cars and hybrid electric vehicles. One known non-aqueous electrolyte secondary battery has an electrode body which has a positive electrode plate, a negative electrode plate and a separator interposed between the positive and negative electrode plates, the positive and negative electrode plates and the separator overlapping one another with their widths oriented in the same direction (see e.g., Paten Literatures 1 to 3).

CITATION LIST

Patent Literatures

Patent Literature 1: JP6(1994)-150900 A
Patent Literature 2: JP2004-95382 A
Patent Literature 3: JP2006-278245 A The non-aqueous electrolyte secondary batteries such as described above are sometimes heated to high temperature owing to heat generation of the battery caused by overcharge or the like so that heat shrinkage of the separator occurs in its width direction. If the separator thermally shrinks in the width direction, the separator becomes absent between the positive and negative electrode plates at the widthwise ends, so that the positive and negative electrode plates are likely to come into contact with each other, causing electrical short circuit. This internal short circuit could lead to further battery heat generation.

With the intent of overcoming the above problem, Patent Literature 1 has proposed the following non-aqueous electrolyte secondary battery. According to Patent Literature 1, positive and negative electrode plates and a separator which is wider than these electrode plates are used, and a rolled-up electrode body is formed by winding the positive and negative electrode plates and the separator such that the widthwise ends of the separator (i.e., first and second ends located at one end and the other end, respectively, of the separator with respect to its width direction) project outwardly from one end (upper end) and the other end (lower end) of the electrode body. Then, the excessive end portions of the separator (the first and second ends of the separator) outwardly protruding from the one end (upper end) and the other end (lower end) of the rolled-up electrode body are heated and thereby thermally shrunken. The excessive end portions of the separator are thus thermally contracted beforehand, thereby inhibiting the heat shrinkage of the excessive end portions of the separator during heat generation of the battery to prevent the contact between the positive and negative electrode plates at the widthwise ends (upper and lower ends).

Another non-aqueous electrolyte secondary battery is disclosed in Patent Literature 2. This battery is composed of a positive electrode plate having positive electrode mixture layers applied to the surfaces of a positive current collector (aluminum foil); a negative electrode plate having negative electrode mixture layers applied to the surfaces of a negative current collector (copper foil); and a separator wider than these electrode plates. The positive and negative electrode plates and the separator are wound to form a rolled-up electrode body such that the widthwise ends of the separator (i.e., first and second ends located at one end and the other end, respectively, of the separator with respect to its width direction) project outwardly from one end and the other end of the electrode body. Fixedly attached to both widthwise ends of the positive electrode plate are insulating films to which fine particles (such as aluminum) having a heat resistance of 500° C. or more are bonded by binder resin. The widthwise ends of the negative electrode plate are also provided with insulating films fixed thereto, these insulating films containing fine particles (such as aluminum) which are bonded to the insulating films by binder resin and have a heat resistance of 500° C. or more. This prevents occurrence of internal short circuit between the positive and negative electrodes, because the insulating films attached to the positive and negative electrode plates come into contact with each other in the event that the separator becomes absent between the positive and negative electrode plates at the widthwise ends owing to shrinkage of the separator in a width direction caused by heat generation of the battery.

SUMMARY OF INVENTION

Technical Problem

The non-aqueous electrolyte secondary battery disclosed in Patent Literature 3 has a rolled-up electrode body in which a first separator end (i.e., the end located at one end of the separator with respect to its width direction) is located more interiorly with respect to the width direction than one positive electrode end (i.e., the end located at one end of the positive electrode plate with respect to its width direction), whereas a second separator end (i.e., the end located at the other end of the separator with respect to its width direction) is located more interiorly with respect to the width direction than an other negative electrode end (i.e., the end located at the other end of the negative electrode plate with respect to its width direction). In other words, the rolled-up electrode body is formed by winding such that the one positive electrode end is more exteriorly located than the first separator end with respect to the width direction whereas the other negative electrode end is more exteriorly located than the second separator end with respect to the width direction. The one positive electrode end is constituted by an uncoated positive electrode portion (or a part thereof) of the positive electrode plate which portion is not coated with the positive electrode mixture layers, and the positive electrode plate and the positive terminal are electrically connected to each other by welding the one positive electrode end to the positive terminal. The other negative electrode end is constituted by an uncoated negative electrode portion (or a part thereof) of the negative electrode plate which portion is not coated with the negative electrode mixture layers, and the negative electrode plate and the negative terminal are electrically connected to each other by welding the other negative electrode end to the negative terminal.

Such a non-aqueous electrolyte secondary battery is still somewhat exposed to the risk of electrical short circuit that is caused as described earlier by the contact between the positive electrode plate and the negative electrode plate at the widthwise ends when the separator thermally shrinks in the width direction due to battery heat generation or the like. In this battery, since the separator does not protrude outwardly from one end and the other end of the rolled-up electrode body (that is, the separator has no excessive end portions), the heating and heat shrinkage of the excessive end portions of the separator such as seen in Patent Literature 1 cannot be carried out. The technique disclosed in Patent Literature 2 has not proved to be useful because insulating resin needs to be prepared and applied to the widthwise ends of the positive and negative electrode plates, which involves troublesome manufacturing processes and, in consequence, incurs high costs.

The invention is directed to overcoming the foregoing problems and a primary object of the invention is therefore to provide an electrode body for use in non-aqueous electrolyte secondary battery and a non-aqueous electrolyte secondary battery which are capable of preventing "the undesirable electric short circuit caused by the contact between the positive electrode plate and the negative electrode plate at the widthwise ends due to heat shrinkage of the separator in the width direction".

Solution to Problem

According to one aspect of the invention, there is provided an electrode body for use in non-aqueous electrolyte secondary battery, the electrode body comprising a positive electrode plate, a negative electrode plate and a separator interposed between the positive and negative electrode plates, the positive electrode plate, negative electrode plate and separator overlapping one another with their widths oriented in the same direction, wherein the positive electrode plate has a positive current collector and a positive electrode mixture layer applied to a surface of the positive current collector; the negative electrode plate has a negative current collector and a negative electrode mixture layer applied to a surface of the negative current collector; the separator has a first end located at one end thereof and a second end located at the other end thereof with respect to a width direction and has an intermediate portion located between the first and second ends; with respect to the width direction, the first separator end is located more interiorly than one positive electrode end which is located at one end of the positive electrode plate with respect to the width direction; located more exteriorly than one end of a coated positive electrode portion of the positive electrode plate which portion is coated with the positive electrode mixture layer; and located more exteriorly than one end of a coated negative electrode portion of the negative electrode plate which portion is coated with the negative electrode mixture layer, the first separator end being thicker than the intermediate portion; and with respect to the width direction, the second separator end is located more interiorly than an other negative electrode end which is located at an other end of the negative electrode plate with respect to the width direction; located more exteriorly than an other end of the coated positive electrode portion; and located more exteriorly than an other end of the coated negative electrode portion, the second separator end being thicker than the intermediate portion.

In the above-described electrode body for use in non-aqueous electrolyte secondary battery, the separator has a first end located at one end thereof, a second end located at the other end thereof, and an intermediate portion located between the first and second ends, with respect to its width direction.

Of these portions, the first separator end is located more interiorly than one positive electrode end with respect to the width direction which end is located at one end of the positive electrode plate with respect to the width direction. In other words, this one positive electrode end is located more exteriorly than the first separator end with respect to the width direction. This one positive electrode end is composed of, for instance, an uncoated positive electrode portion (or a part thereof) of the positive electrode plate which portion is not coated with the positive electrode mixture layer. In this case, the positive electrode plate and the positive terminal can be electrically connected to each other by welding the one positive electrode end to the positive terminal.

The second separator end is located more interiorly than an other negative electrode end with respect to the width direction which end is located at an other end of the negative electrode plate with respect to the width direction. In other words, the other negative electrode end is located more exteriorly than the second separator end with respect to the width direction. This other negative electrode end is composed of, for instance, an uncoated negative electrode portion (or a part thereof) of the negative electrode plate which portion is not coated with the negative electrode mixture layer. In this case, the negative electrode plate and the negative terminal are electrically connected to each other by welding the other negative electrode end to the negative terminal.

Further, with respect to the width direction, the first separator end is located more exteriorly than one end of a coated positive electrode portion of the positive electrode plate which portion is coated with the positive electrode mixture layer and located more exteriorly than one end (that corresponds to one end of the negative electrode plate) of a coated negative electrode portion of the negative electrode plate which portion is coated with the negative electrode mixture layer. In addition, the first separator end is thicker than the intermediate portion.

Further, with respect to the width direction, the second separator end is located more exteriorly than an other end (that corresponds to an other end of the positive electrode plate) of the coated positive electrode portion and located more exteriorly than an other end of the coated negative electrode portion. In addition, the second separator end is thicker than the intermediate portion.

Therefore, use of the above-described electrode body in a non-aqueous electrolyte secondary battery makes it possible to prevent "the undesirable electric short circuit caused by the contact between the positive electrode plate and the negative electrode plate at the widthwise ends due to heat shrinkage of the separator in the width direction".

For example, even if the separator thermally shrinks in the width direction so that the first separator end is displaced inwardly (toward the other end) in the width direction whereas the second separator end being displaced inwardly (toward the one end) in the width direction, the first separator end will strike against the end face of at least either the one end of the coated positive electrode portion or the one end of the coated negative electrode portion and therefore will be unable to further move inwardly in the width direction (toward the other end), thanks to the configuration of the first and second separator ends which are thicker than the intermediate portion. Further, the second separator end will strike against the end face of either the other end of the coated positive electrode portion or the other end of the coated negative electrode portion and therefore will be unable to further move inwardly in the width direction (toward the one end). This enables it to keep the separator present between the positive and negative electrode plates with respect to the width direction, thereby maintaining the electrical insulation between the positive and negative electrode plates.

One form of the configuration in which the first and second separator ends are thicker than the intermediate portion is such that the first and second separator ends are folded back on themselves (e.g., folded double) thereby to make them thicker (e.g., twice thicker) than the intermediate portion.

According to another aspect of the invention, there is provided an electrode body for use in non-aqueous electrolyte secondary battery, the electrode body comprising a positive electrode plate, a negative electrode plate and a separator interposed between the positive and negative electrode plates, the positive electrode plate, negative electrode plate and separator overlapping one another with their widths oriented in the same direction, wherein the positive electrode plate has a positive current collector and a positive electrode mixture layer applied to a surface of the positive current collector; the negative electrode plate has a negative current collector and a negative electrode mixture layer applied to a surface of the negative current collector; the separator has a first end located at one end thereof and a second end located at the other end thereof with respect to a width direction and has an intermediate portion located between the first and second ends; with respect to the width direction, the first separator end is located more interiorly than one positive electrode end which is located at one end of the positive electrode plate with respect to the width direction; located more exteriorly than one end of a coated positive electrode portion of the positive electrode plate which portion is coated with the positive electrode mixture layer; and located more exteriorly than one end of a coated negative electrode portion of the negative electrode plate which portion is coated with the negative electrode mixture layer, the first separator end being thermally shrunken by heating beforehand; and with respect to the width direction, the second separator end is located more interiorly than an other negative electrode end which is located at an other end of the negative electrode plate with respect to the width direction; located more exteriorly than an other end of the coated positive electrode portion; and located more exteriorly than an other end of the coated negative electrode portion, the second separator end being thermally shrunken by heating beforehand.

In the above-described electrode body for use in non-aqueous electrolyte secondary battery, the first separator end is located more interiorly than one positive electrode end with respect to the width direction which end is located at one end of the positive electrode plate with respect to the width direction. In other words, the one positive electrode end is located more exteriorly than the first separator end with respect to the width direction. This one positive electrode end is composed of, for instance, an uncoated positive electrode portion (or a part thereof) of the positive electrode plate which portion is not coated with the positive electrode mixture layer. In this case, the positive electrode plate and the positive terminal can be electrically connected to each other by welding the one positive electrode end to the positive terminal.

The second separator end is located more interiorly than an other negative electrode end with respect to the width direction which end is located at an other end of the negative electrode plate with respect to the width direction. In other words, the other negative electrode end is located more exteriorly than the second separator end with respect to the width direction. This other negative electrode end is composed of, for instance, an uncoated negative electrode portion (or a part thereof) of the negative electrode plate which portion is not coated with the negative electrode mixture layer. In this case, the negative electrode plate and the negative terminal are electrically connected to each other by welding the other negative electrode end to the negative terminal.

Further, with respect to the width direction, the first separator end is located more exteriorly than one end of a coated positive electrode portion of the positive electrode plate which portion is coated with the positive electrode mixture layer and located more exteriorly than one end (that corresponds to one end of the negative electrode plate) of a coated negative electrode portion of the negative electrode plate which portion is coated with the negative electrode mixture layer. In addition, the first separator end is thermally shrunken by heating beforehand (i.e., the first separator end is thermally shrunken by heating during the process of manufacturing the electrode body).

Further, with respect to the width direction, the second separator end is located more exteriorly than an other end (that corresponds to an other end of the positive electrode plate) of the coated positive electrode portion and located more exteriorly than an other end of the coated negative electrode portion. In addition, the second separator end is thermally shrunken by heating beforehand (i.e., the second separator end is thermally shrunken by heating during the process of manufacturing the electrode body).

Therefore, use of the above-described electrode body in a non-aqueous electrolyte secondary battery makes it possible to prevent "the undesirable electric short circuit caused by the contact between the positive electrode plate and the negative electrode plate at the widthwise ends due to heat shrinkage of the separator in the width direction".

Specifically, even if the separator is heated by heat generation of the battery to a temperature that causes the separator to thermally shrink in the width direction, the first and second separator ends are unlikely to thermally shrink further in the width direction because they have already been thermally shrunken by heating beforehand. This enables it to keep the separator present between the positive and negative electrode plates with respect to the width direction, thereby maintaining the electrical insulation between the positive and negative electrode plates.

According to another aspect of the invention, there is provided an electrode body for use in non-aqueous electrolyte secondary battery, the electrode body comprising a positive electrode plate, a negative electrode plate and a separator interposed between the positive and negative electrode plates, the positive electrode plate, negative electrode plate and separator overlapping one another with their widths oriented in the same direction, wherein the positive electrode plate has a positive current collector and a positive electrode mixture layer applied to a surface of the positive current collector; the negative electrode plate has a negative current collector and a negative electrode mixture layer applied to a surface of the negative current collector; the separator has a first end located at one end thereof and a second end located at the other end thereof with respect to a width direction and has an intermediate portion located between the first and second ends; with respect to the width direction, the first separator end is located more interiorly than one positive electrode end which is located at one end of the positive electrode plate with respect to the width direction; located more exteriorly than one end of a coated positive electrode portion of the positive electrode plate which portion is coated with the positive electrode mixture layer; and located more exteriorly than one end of a coated negative electrode portion of the negative electrode plate which portion is coated with the negative electrode mixture layer, the first separator end being heat-welded to a portion of the positive electrode plate which portion is opposed to the separator in its thickness direction; and with respect to the width direction, the second separator end is located more interiorly than an other negative electrode end which is located at an other end of the negative electrode plate with respect to the width direction; located more exteriorly than an other end of the coated positive electrode portion; and located more exteriorly than an other end of the coated negative electrode portion, the second separator end being heat-welded to a portion of the negative electrode plate which portion is opposed to the separator in its thickness direction.

In the above-described electrode body for use in non-aqueous electrolyte secondary battery, the first separator end is located more interiorly than one positive electrode end with respect to the width direction which end is located at one end of the positive electrode plate with respect to the width direction. In other words, the one positive electrode end is located more exteriorly than the first separator end with respect to the width direction. This one positive electrode end is composed of, for instance, an uncoated positive electrode portion (or a part thereof) of the positive electrode plate which portion is not coated with the positive electrode mixture layer. In this case, the positive electrode plate and the positive terminal can be electrically connected to each other by welding the one positive electrode end to the positive terminal.

The second separator end is located more interiorly than an other negative electrode end with respect to the width direction which end is located at an other end of the negative electrode plate with respect to the width direction. In other words, the other negative electrode end is located more exteriorly than the second separator end with respect to the width direction. This other negative electrode end is composed of, for instance, an uncoated negative electrode portion (or a part thereof) of the negative electrode plate which portion is not coated with the negative electrode mixture layer. In this case, the negative electrode plate and the negative terminal are electrically connected to each other by welding the other negative electrode end to the negative terminal.

Further, with respect to the width direction, the first separator end is located more exteriorly than one end of the coated positive electrode portion of the positive electrode plate which portion is coated with the positive electrode mixture layer and located more exteriorly than one end (that corresponds to one end of the negative electrode plate) of the coated negative electrode portion of the negative electrode plate which portion is coated with the negative electrode mixture layer. In addition, the first separator end is heat-welded to a portion of the positive electrode plate which portion is opposed to the separator in its thickness direction (specifically, during the process of manufacturing the electrode body, the first separator end is heat-welded to the portion of the positive electrode plate which portion is opposed to the separator in its thickness direction).

Further, with respect to the width direction, the second separator end is located more exteriorly than an other end (that corresponds to an other end of the positive electrode plate) of the coated positive electrode portion and located more exteriorly than an other end of the coated negative electrode portion. In addition, the second separator end is heat-welded to a portion of the negative electrode plate which portion is opposed to the separator in its thickness direction (specifically, during the process of manufacturing the electrode body, the second separator end is heat-welded to the portion of the negative electrode plate which portion is opposed to the separator in its thickness direction).

Therefore, use of the above-described electrode body in a non-aqueous electrolyte secondary battery makes it possible to prevent "the undesirable electric short circuit caused by the contact between the positive electrode plate and the negative electrode plate at the widthwise ends due to heat shrinkage of the separator in the width direction".

Specifically, even if the separator is heated by heat generation of the battery to a temperature that causes the separator to thermally shrink in its width direction, the first and second separator ends are unlikely to thermally shrink further in the width direction because they have already been thermally shrunken by heating at the time of heat-welding. In addition, since the first and second separator ends are adhered (heat-welded) to the portions of the positive and negative electrode plates respectively which portions are opposed to the separator, the inward displacement of the first and second separator ends in the width direction can be prevented even if heat shrinkage forces them to move inwardly in the width direction. This enables it to keep the separator present between the positive and negative electrode plates with respect to the width direction, thereby maintaining the electrical insulation between the positive and negative electrode plates.

In the above-described electrode body for use in non-aqueous electrolyte secondary battery, preferably, the portion of the positive electrode plate to which the first separator end is heat-welded is at least a part of an uncoated positive electrode portion of the positive electrode plate which portion is not coated with the positive electrode mixture layer, whereas the portion of the negative electrode plate to which the second separator end is heat-welded is at least a part of an uncoated negative electrode portion of the negative electrode plate which portion is not coated with the negative electrode mixture layer.

In the above-described electrode body for use in non-aqueous electrolyte secondary battery, the portion of the positive electrode plate to which the first separator end is heat-welded is at least a part of the uncoated positive electrode portion (where the positive current collector is exposed) of the positive electrode plate which portion is not coated with the positive electrode mixture layer. In other words, the first separator end is heat-welded to the uncoated positive electrode portion (or at least a part thereof) of the positive electrode plate which portion is not coated with the positive electrode mixture layer. This enables proper adhesion (heat-welding) of the first separator end to the positive electrode plate.

In the above-described electrode body for use in non-aqueous electrolyte secondary battery, the portion of the negative electrode plate to which the second separator end is heat-welded is at least a part of the uncoated negative electrode portion (where the negative current collector is exposed) of the negative electrode plate which portion is not coated with the negative electrode mixture layer. In other words, the second separator end is heat-welded to the uncoated negative electrode portion (or at least a part thereof) of the negative electrode plate which portion is not coated with the negative electrode mixture layer. This enables proper adhesion (heat-welding) of the second separator end to the negative electrode plate.

According to still another aspect of the invention, there is provided a non-aqueous electrolyte secondary battery comprising any one of the above-described electrode bodies for use in non-aqueous electrolyte secondary battery.

The above non-aqueous electrolyte secondary battery is provided with any one of the above-described electrode bodies for use in non-aqueous electrolyte secondary battery. Therefore, the above-described non-aqueous electrolyte secondary battery makes it possible to prevent "the undesirable electric short circuit caused by the contact between the positive electrode plate and the negative electrode plate at the widthwise ends due to heat shrinkage of the separator in the width direction".

DESCRIPTION OF EMBODIMENTS (First Embodiment)

Figure 1:
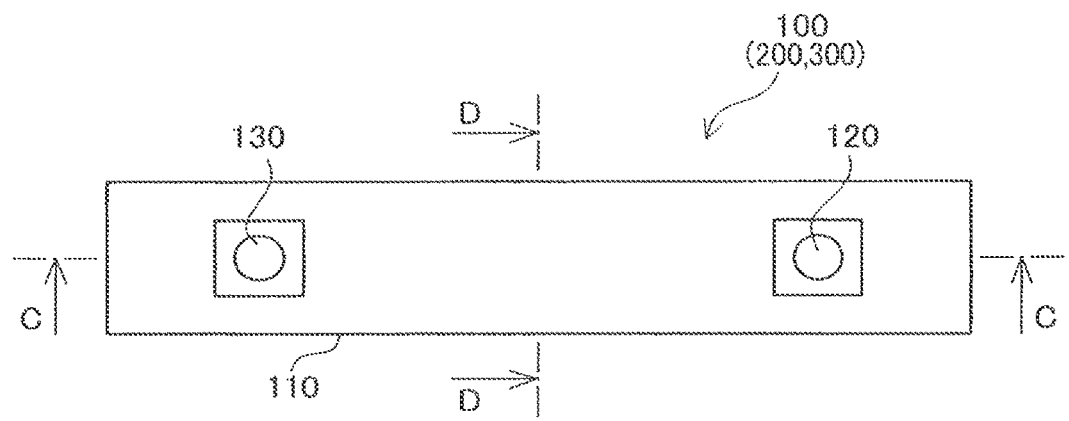
FIG. 1 is a top view of a non-aqueous electrolyte secondary battery in first to third embodiments.
Figure 2:
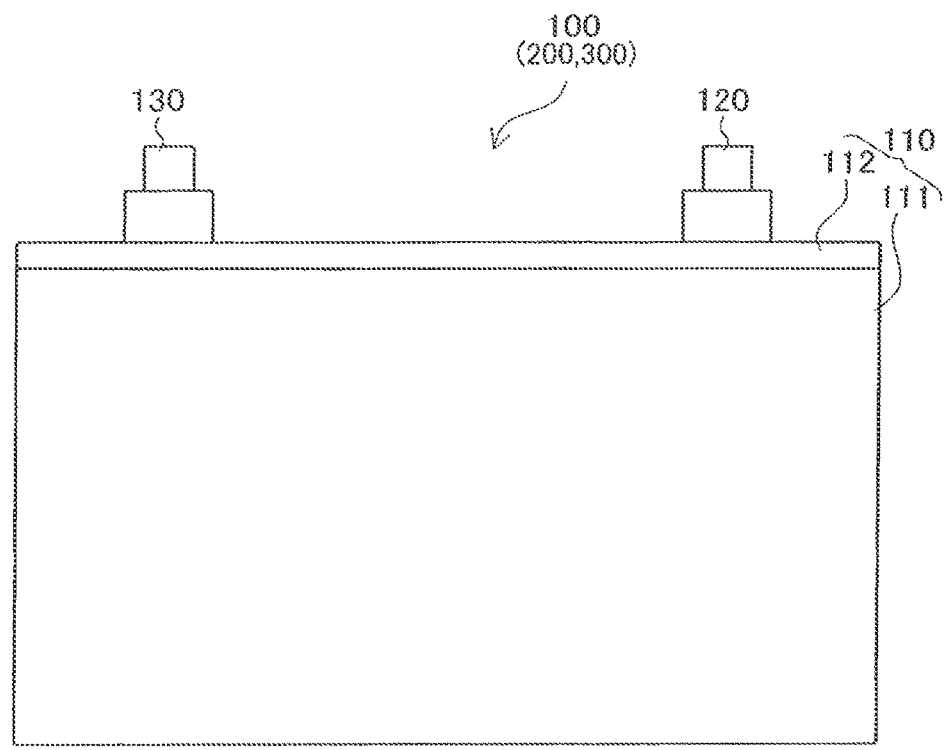
FIG. 2 is a front view of the non-aqueous electrolyte secondary battery.

Referring now to the accompanying drawings, the invention will be described according to a first embodiment.

As shown in FIGS. 1 to 4, a non-aqueous electrolyte secondary battery 100 constructed according to the first embodiment is a rectangular sealed lithium ion secondary battery having a rectangular parallelepiped battery case 110, a positive terminal 120 and a negative terminal 130. Of these components, the battery case 110 is a hard case composed of a metallic rectangular storage section 111 and a metallic lid 112, the storage section 111 including a rectangular parallelepiped storage space. Disposed within the battery case 110 (rectangular storage section 11) are an electrode body 150 and others. The rated capacity (nominal capacity) of the non-aqueous electrolyte secondary battery 100 is 5.5 Ah.

The electrode body 150 is a flat rolled-up body having an oval-shaped cross section and composed of a positive electrode plate 155, a negative electrode plate 156 and a separator 157 which are wound into a flat shape (see FIGS. 4 to 13). The positive electrode plate 155, the negative electrode plate 156 and the separator 157 overlap one another with their widths oriented in the same direction (see FIGS. 6 and 13). It should be noted that the longitudinal directions (perpendicular to the width directions) of the positive electrode plate 155, the negative electrode plate 156 and the separator 157 coincide with the winding direction. The lateral directions of FIGS. 6 and 13 coincide with the respective width directions of the positive electrode plate 155, the negative electrode plate 156 and the separator 157 and with the width direction of the electrode body 150.

Figure 7:
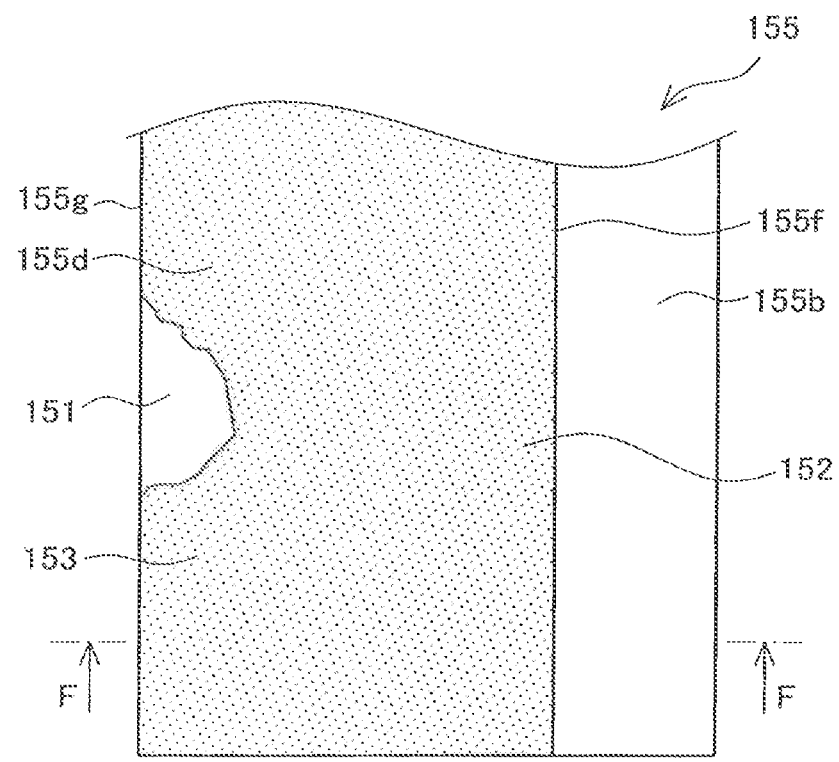
FIG. 7 is a top view of a positive electrode plate in the first to third embodiments.
Figure 8:
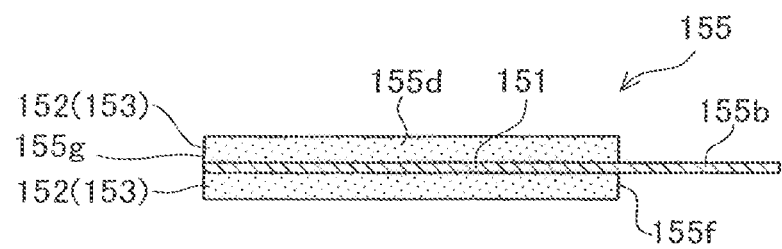
FIG. 8 is a sectional view of the positive electrode plate, taken along a line F-F in FIG. 7.

The positive electrode plate 155 is strip-like in shape and includes a positive current collector 151 made of aluminum foil and positive electrode mixture layers 152 (i.e., mixture layers containing a positive active material 153) applied to the surfaces (both surfaces), respectively, of the positive current collector 151 (see FIGS. 7 and 8). The positive electrode plate 155 is composed of a coated positive electrode portion 155$d$ in which the surfaces of the positive current collector 151 are coated with the positive electrode mixture layers 152 respectively and an uncoated positive electrode portion 155$b$ in which the surfaces of the positive current collector 151 are not coated with the positive electrode mixture layers 152. The uncoated positive electrode portion 155$b$ is composed of only the positive current collector 151 and located at one end of the positive electrode plate 155 with respect to the width direction (located at the right end in FIGS. 7, 8), extending in the longitudinal direction of the positive electrode plate 155. The lateral directions of FIGS. 7 and 8 coincide with the width direction of the positive electrode plate 155. The vertical direction of FIG. 7 coincides with the longitudinal direction of the positive electrode plate 155. The vertical direction of FIG. 8 coincides with the thickness direction of the positive electrode plate 155.

Figure 9:
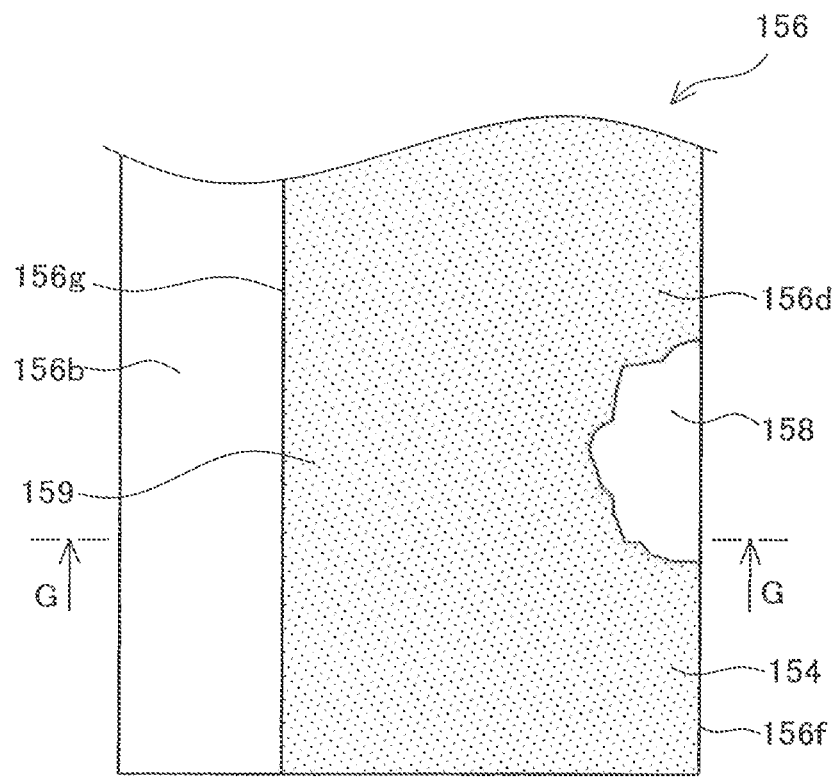
FIG. 9 is a top view of a negative electrode plate in the first to third embodiments.
Figure 10:
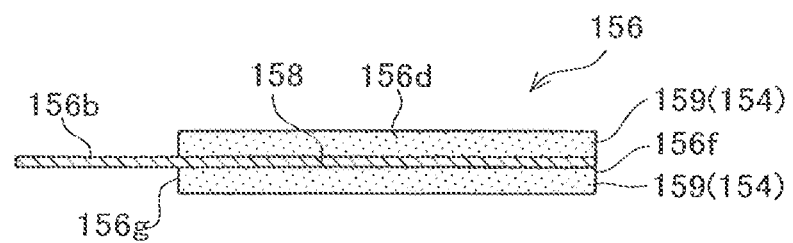
FIG. 10 is a sectional view of the negative electrode plate, taken along a line G-G in FIG. 9.

The negative electrode plate 156 is strip-like in shape and includes a negative current collector 158 made of copper foil and negative electrode mixture layers 159 (mixture layers containing a negative active material 154) applied to the surfaces, respectively, of the negative current collector 158 (see FIGS. 9 and 10). The negative electrode plate 156 is composed of a coated negative electrode portion 156*d* in which the surfaces of the negative current collector 158 are coated with the negative electrode mixture layers 159 respectively and an uncoated negative electrode portion 156*b* in which the surfaces of the negative current collector 158 are not coated with the negative electrode mixture layers 159. The uncoated negative electrode portion 156*b* is composed of only the negative current collector 158 and located at the other end of the negative electrode plate 156 with respect to the width direction (located at the left end in FIGS. 9, 10), extending in the longitudinal direction of the negative electrode plate 156. The lateral directions of FIGS. 9 and 10 coincide with the width direction of the negative electrode plate 156. The vertical direction of FIG. 9 coincides with the longitudinal direction of the negative electrode plate 156. The vertical direction of FIG. 10 coincides with the thickness direction of the negative electrode plate 156.

Figure 11:
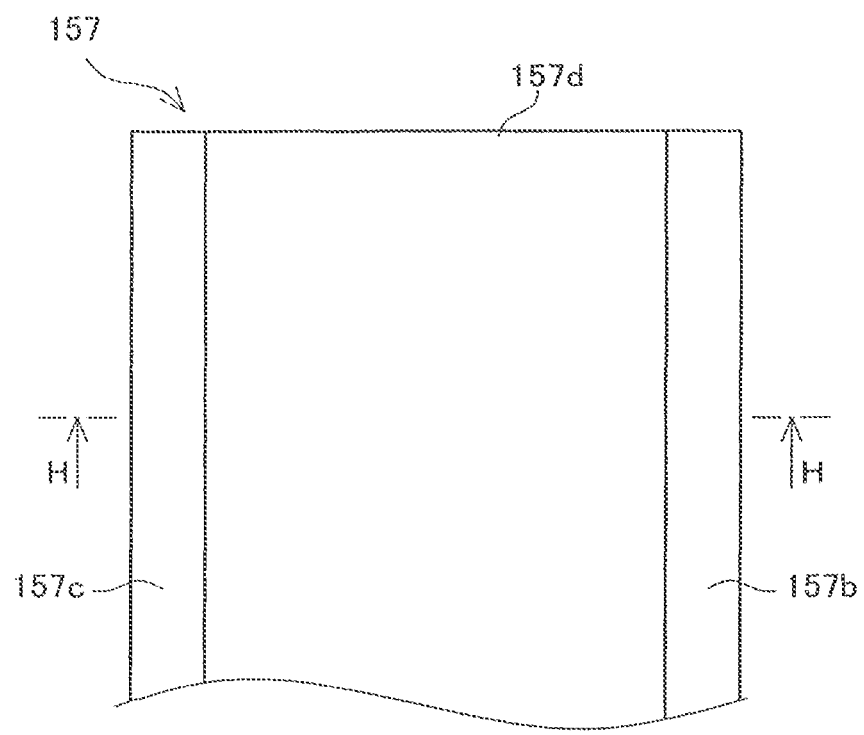
FIG. 11 is a top view of a separator in the first embodiment.
Figure 12:
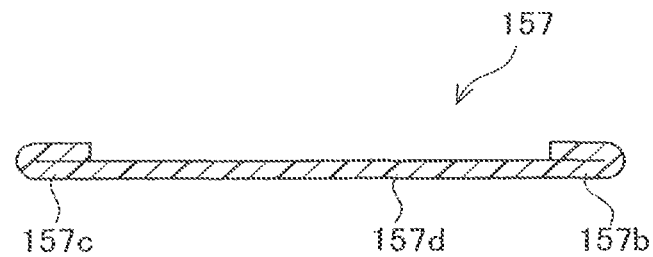
FIG. 12 is a sectional view of the separator taken along a line H-H in FIG. 11.

The separator 157 is composed of a polypropylene-polyethylene-polypropylene trilaminar composite porous sheet and has a strip shape (see FIGS. 11 and 12). This separator 157 is interposed between the positive electrode plate 155 and the negative electrode plate 156 so as to provide electrical insulation between them (see FIG. 6). It should be noted that the lateral directions of FIGS. 11 and 12 coincide with the width direction of the separator 157. The vertical direction of FIG. 9 coincides with the longitudinal direction of the negative electrode plate 156. The vertical direction of FIG. 10 coincides with the thickness direction of the negative electrode plate 156.

The separator 157 has a first end 157*b*, a second end 157*c* and an intermediate portion 157*d*. When viewed in the width direction, the first end 157*b* is located at one end (the right end in FIGS. 1, 12), the second end 157*c* is located at the other end (the left end in FIGS. 11, 12), and the intermediate portion 157*d* is located between the first end 157*b* and the second end 157*c*.

Figure 6:
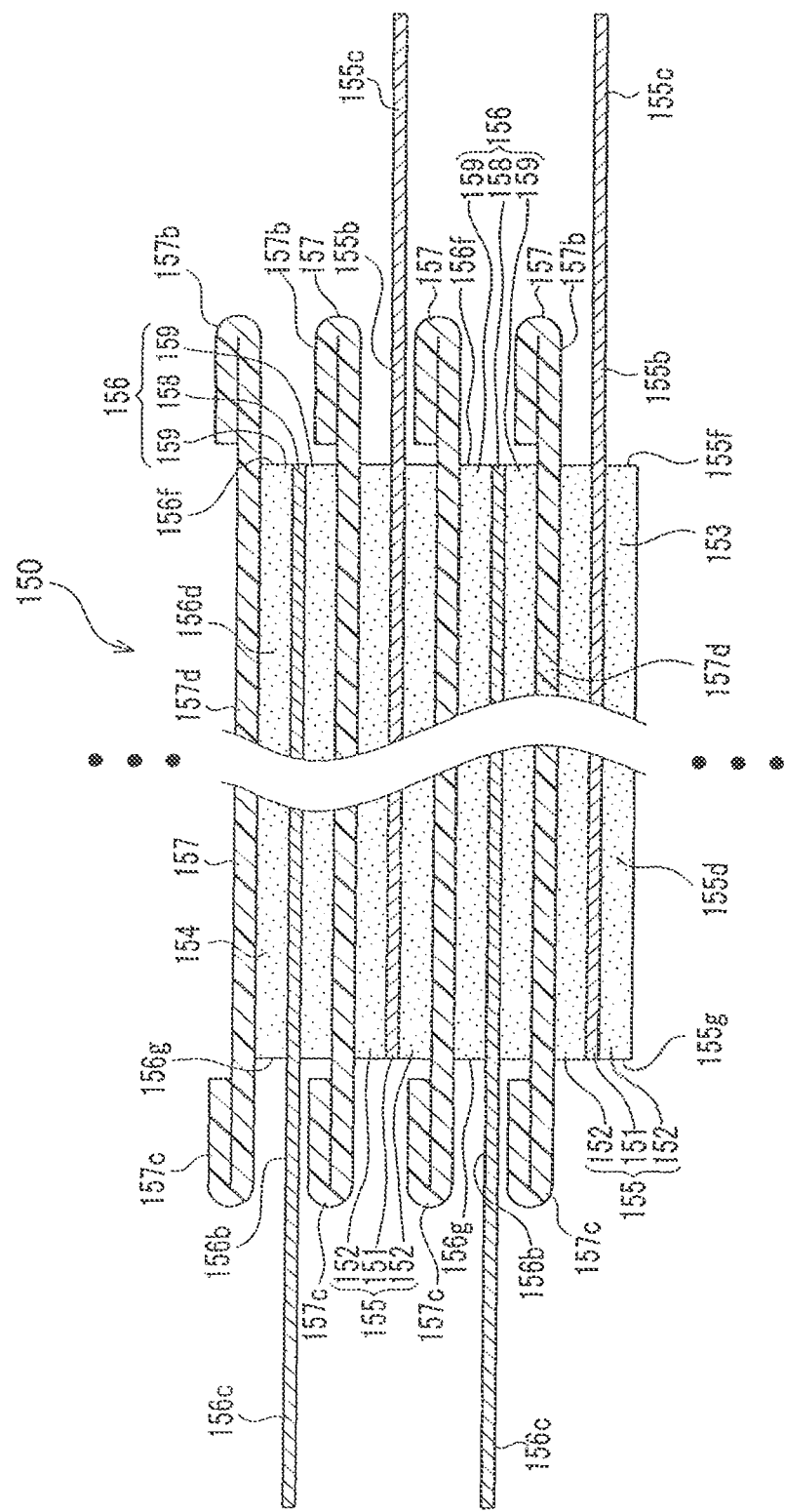
FIG. 6 is a cross sectional view of the electrode body in the first embodiment, taken along a line E-E in FIG. 3.

As shown in FIG. 6, in the electrode body 150 of the first embodiment, the first end 157*b* of the separator 157 is located more interiorly than (located closer to the center of the electrode body 150 than) one positive electrode end 155*c* is, with respect to the width direction (lateral direction in FIG. 6), the end 155*c* being located at one end (right end in FIG. 6) of the positive electrode plate 155 with respect to the width direction. In other words, the one positive electrode end 155*c* is located more exteriorly than (is more distant from the center of the electrode body 150 than) the first end 157*b* of the separator 157 is, with respect to the width direction. This one positive electrode end 155*c* is constituted by the uncoated positive electrode portion 155*b* (or a part thereof) of the positive electrode plate 155. Therefore, the positive electrode plate 155 and the positive terminal 120 can be electrically connected to each other by welding the one positive electrode end 155*c* to a positive current collecting portion 122 of the positive terminal 120 as described later (see FIG. 3).

In addition, the second end 157*c* of the separator 157 is located more interiorly than (located closer to the center of the electrode body 150 than) an other negative electrode end 156*c* is, with respect to the width direction (lateral direction in FIG. 6), the end 156*c* being located at the other end (left end in FIG. 6) of the negative electrode plate 156 with respect to the width direction. In other words, the other negative electrode end 156*c* is located more exteriorly than (is more distant from the center of the electrode body 150 than) the second end 157*c* of the separator 157 is, with respect to the width direction. The other negative electrode end 156*c* is constituted by the uncoated negative electrode portion 156*b* (or a part thereof) of the negative electrode plate 156. Therefore, the negative electrode plate 156 and the negative terminal 130 can be electrically connected to each other by welding the other negative electrode end 156*c* to a negative current collecting portion 132 of the negative terminal 130 as described later (see FIG. 3).

As shown in FIG. 6, in the electrode body 150 of the first embodiment, the first end 157*b* of the separator 157 is located more exteriorly than (located, in FIG. 6, on the right side of) one end 155*f* of the coated positive electrode portion 155*d* of the positive electrode plate 155 and located more exteriorly than (located, in FIG. 6, on the right side of) one end 156*f* (which corresponds to one end of the negative electrode plate 156) of the coated negative electrode portion 156*d* of the negative electrode plate 156, with respect to the width direction (lateral direction in FIG. 6). In addition, the first end 157*b* of the separator 157 is thicker than the intermediate portion 157*d* (see FIGS. 6, 12). More specifically, the first end 157*b* of the separator 157 is folded double so as to be thicker than the intermediate portion 157*d* (twice thicker than the intermediate portion 157*d*).

The second end 157*c* of the separator 157 is located more exteriorly than (located, in FIG. 6, on the left side of) an other end 155*g* (which corresponds to the other end of the positive electrode plate 155) of the coated positive electrode portion 155*d* of the positive electrode plate 155 and located more exteriorly than (located, in FIG. 6, on the left side of) an other end 156*g* of the coated negative electrode portion 156*d* of the negative electrode plate 156 with respect to the width direction (lateral direction in FIG. 6). In addition, the second end 157*c* of the separator 157 is thicker than the intermediate portion 157*d* (see FIGS. 6, 12). More specifically, the second end 157*c* of the separator 157 is folded double so as to be thicker than the intermediate portion 157*d* (twice thicker than the intermediate portion 157*d*).

Since the non-aqueous electrolyte secondary battery 100 of the first embodiment has the above-described electrode body 150, it is possible to prevent "the undesirable electric short circuit caused by the contact between the positive electrode plate 155 and the negative electrode plate 156 at the widthwise ends (the lateral ends of the coated positive electrode portion 155*d* and the coated negative electrode portion 156*d* in FIG. 6) due to heat shrinkage of the separator 157 in the width direction (lateral direction in FIG. 6)".

Concretely, if the temperature of the non-aqueous electrolyte secondary battery 100 becomes high for some reason, the separator 157 made of resin thermally shrinks in the width direction. At that time, the first end 157*b* of the separator 157 moves inwardly in the width direction (toward the left in FIG. 6) while the second end 157*c* moving inwardly in the width direction (toward the right in FIG. 6).

However, in the separator 157 of the first embodiment, the first end 157*b* of the separator 157 strikes against the end face of the one end 155*f* of the coated positive electrode portion 155*d* or the one end 156*f* of the coated negative electrode portion 156*d* and therefore cannot inwardly move further in the width direction (to the left in FIG. 6), because the first end 157*b* and the second end 157*c* are thicker than the intermediate portion 157*d*. This enables it to prevent "the undesirable contact between the one end 155*f* of the coated positive electrode portion 155*d* and the one end 156*f* of the coated negative electrode portion 156*d* which contact is caused by the first end 157b of the separator 157 getting into the interface between the positive electrode plate 155 (coated positive electrode portion 155d) and the negative electrode plate 156 (coated negative electrode portion 156d)". It should be noted that the first end 157b formed by folding the separator 157 double is softened by heat so that it becomes an integral portion (mass).

The second end 157c of the separator 157 strikes against the end face of the other end 155g of the coated positive electrode portion 155d or the other end 156g of the coated negative electrode portion 156d and therefore cannot inwardly move further in the width direction (to the right in FIG. 6). This enables it to prevent "the undesirable contact between the other end 155g of the coated positive electrode portion 155d and the other end 156g of the coated negative electrode portion 156d which contact is caused by the second end 157c of the separator 157 getting into the interface between the positive electrode plate 155 (coated positive electrode portion 155d) and the negative electrode plate 156 (coated negative electrode portion 156d)". It should be noted that the second end 157c formed by folding the separator 157 double is softened by heat so that it becomes an integral portion (mass).

Therefore, in the non-aqueous electrolyte secondary battery 100 of the first embodiment, even if the temperature of the separator 157 rises to a temperature (e.g., 150° C.) that causes heat shrinkage of the separator 157, the separator can be kept present between the positive electrode plate 155 and the negative electrode plate 156 with respect to the width direction (lateral direction in FIG. 6) of the electrode body 150, thereby maintaining the electric insulation between the positive electrode plate 155 and the negative electrode plate 156.

Next, the process of manufacturing the non-aqueous electrolyte secondary battery 100 will be explained.

First, the positive electrode plate 155, having the positive electrode mixture layers 152 applied to the surfaces of the strip-shaped positive current collector 151 as shown in FIGS. 7 and 8, is prepared. Then, the negative electrode plate 156, having the negative electrode mixture layers 159 applied to the surfaces of the strip-shaped negative current collector 158 as shown in FIGS. 9 and 10, is prepared. Then, the separator 157, the widthwise ends (the first end 157b and the second end 157c) of which are folded double such that they become thicker than the intermediate portion 157d (twice thicker than the intermediate portion 157d) as shown in FIGS. 11 and 12, is prepared.

Figure 5:
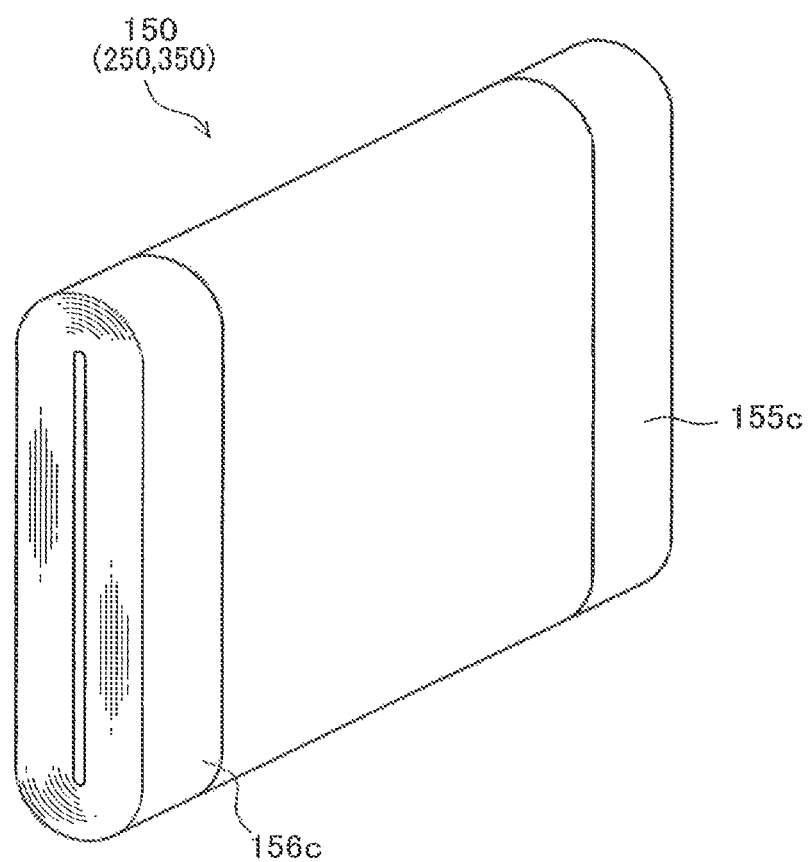
FIG. 5 is a perspective view of an electrode body of the non-aqueous electrolyte secondary battery.
Figure 13:
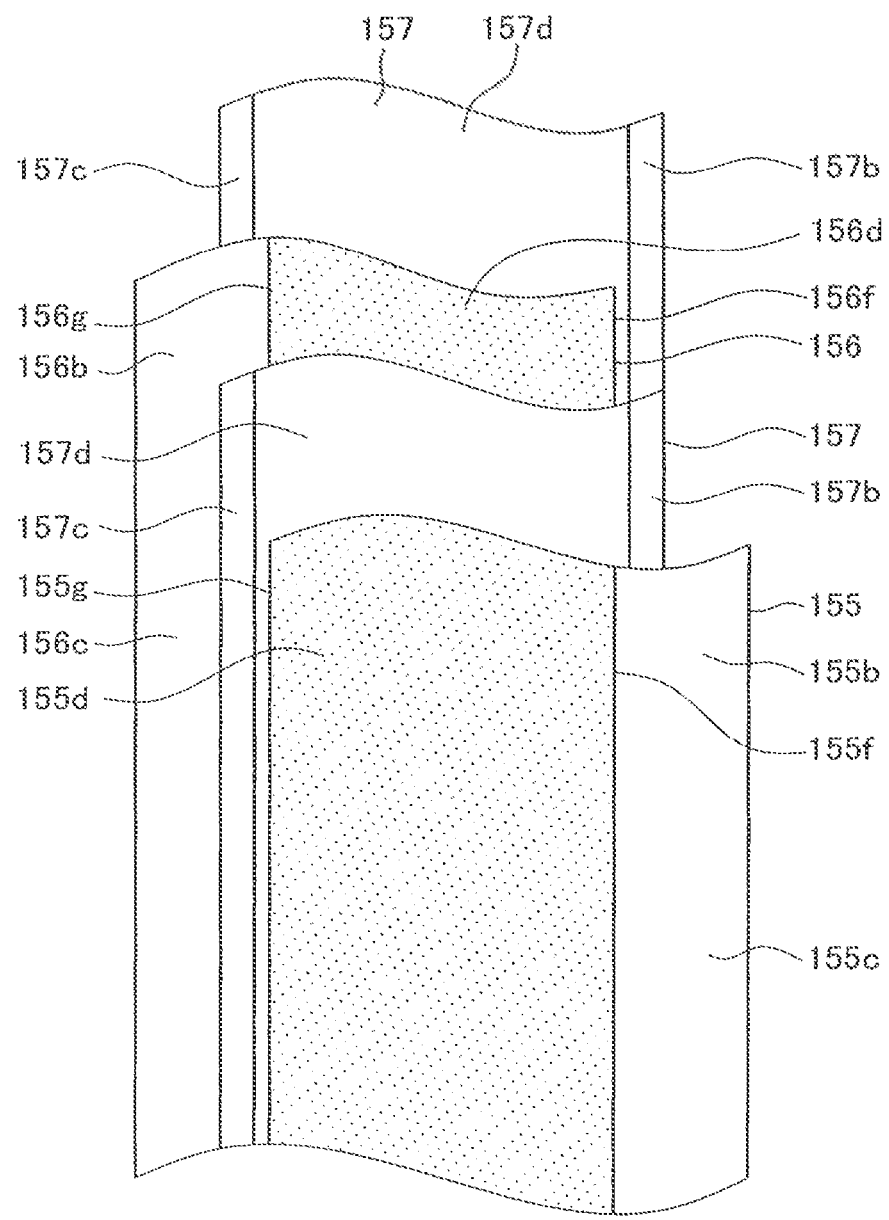
FIG. 13 is an explanatory view showing a process of manufacturing the electrode body in the first embodiment.

Next, the positive electrode plate 155, the negative electrode plate 156 and the separator 157 are wound into a flat roll such that they overlap one another as shown in FIG. 13, whereby the electrode body 150 is formed (see FIG. 5). More specifically, the positive electrode plate 155, the negative electrode plate 156 and the separator 157 are arranged as follows when they are rolled up. With respect to the width direction, the first end 157b of the separator 157 is located more interiorly than (located, in FIG. 13, on the left side of) the one positive electrode end 155c of the positive electrode plate 155; located more exteriorly than (located, in FIG. 13, on the right side of) the one end 155f of the coated positive electrode portion 155d of the positive electrode plate 155; and located more exteriorly than (located, in FIG. 13, on the right side of) the one end 156f of the coated negative electrode portion 156d of the negative electrode plate 156. Further, with respect to the width direction (lateral direction in FIG. 13), the second end 157c of the separator 157 is located more interiorly than (located, in FIG. 13, on the right side of) the other negative electrode end 156c of the negative electrode plate 156; located more exteriorly than (located, in FIG. 13, on the left side of) the other end 155g of the coated positive electrode portion 155d of the positive electrode plate 155; and located more exteriorly than (located, in FIG. 13, on the left side of) the other end 156g of the coated negative electrode portion 156d of the negative electrode plate 156.

Figure 3:
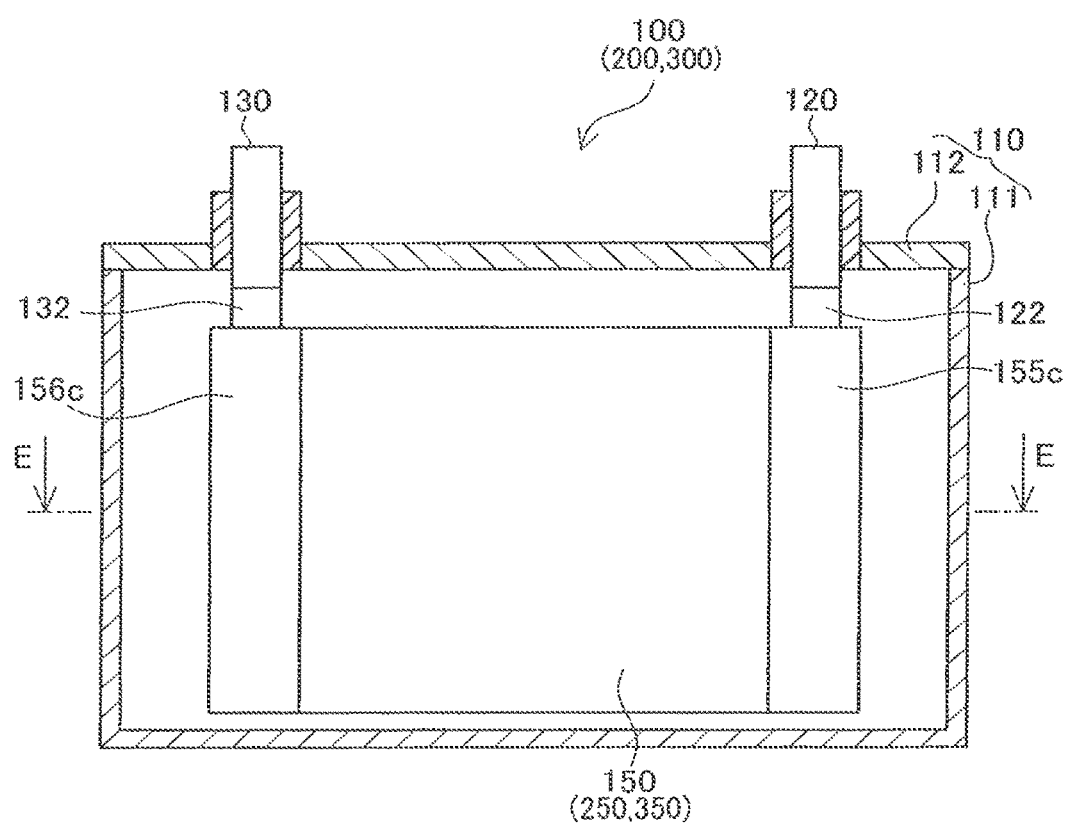
FIG. 3 is a longitudinal sectional view of the non-aqueous electrolyte secondary battery, taken along a line C-C in FIG. 1.
Figure 4:
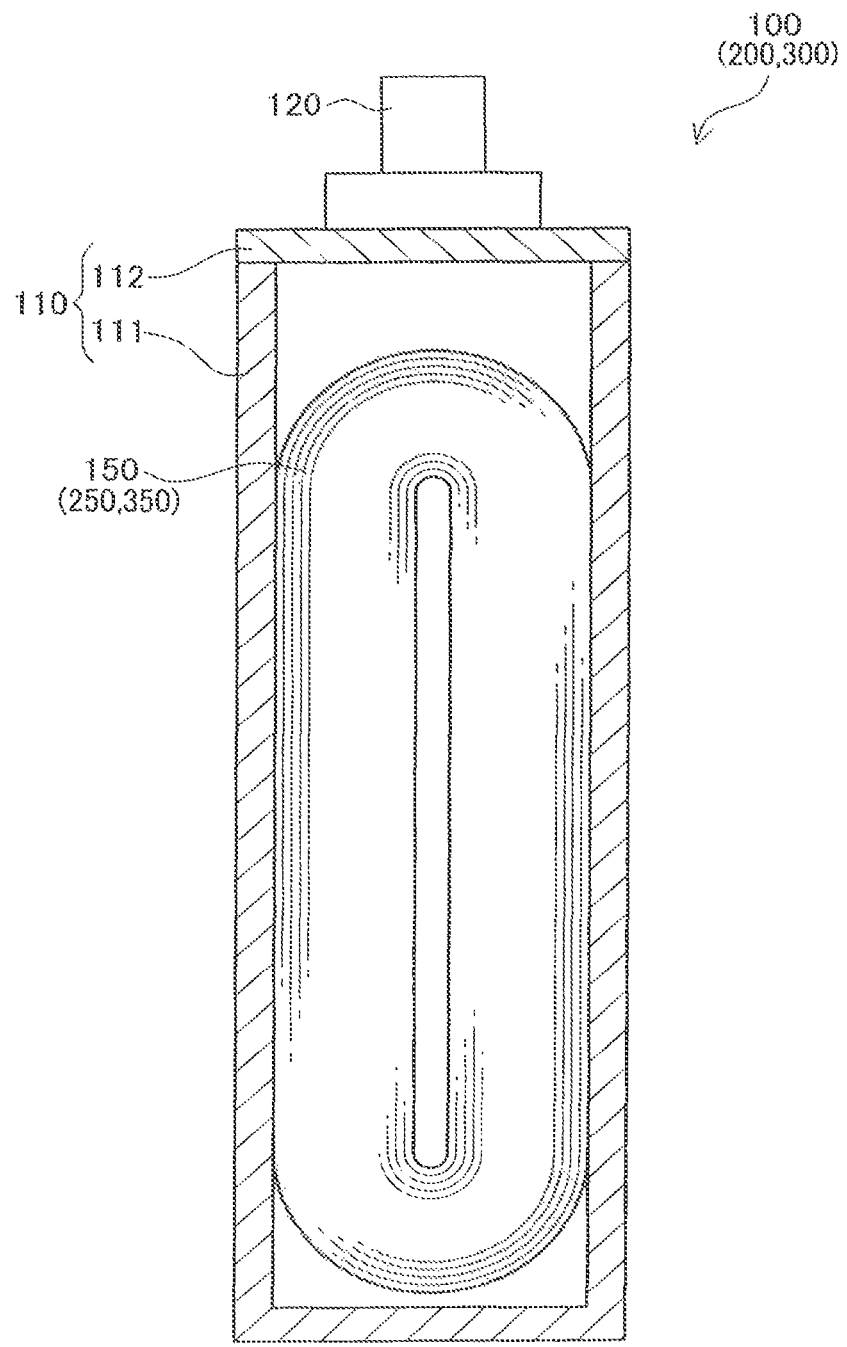
FIG. 4 is a longitudinal sectional view of the non-aqueous electrolyte secondary battery, taken along a line D-D in FIG. 1.

Then, the positive current collecting portion 122 of the positive terminal 120 is welded to the upper end of the one positive electrode end 155c of the electrode body 150 (see FIG. 3). The negative current collecting portion 132 of the negative terminal 130 is welded to the upper end of the other negative electrode end 156c of the electrode body 150. After this electrode body 150 is accommodated within the rectangular storage section 111, the opening of the rectangular storage section 111 is closed with the lid 112. Thereafter, the lid 112 is welded to the rectangular storage section 111. Subsequently, a non-aqueous electrolytic solution is poured into the rectangular storage section 111 through a pouring port (not shown) formed in the lid 112 (at that time, the electrode body 150 is impregnated with the non-aqueous electrolytic solution). The pouring port is then sealed and the manufacture of the non-aqueous electrolyte secondary battery 100 of the first embodiment is accordingly completed.

(Second Embodiment)

A non-aqueous electrolyte secondary battery 200 constructed according to the second embodiment does not differ from the non-aqueous electrolyte secondary battery 100 of the first embodiment except the separator of the electrode body. Therefore, the points different from the first embodiment are mainly discussed herein while explanation of the similar or identical points is omitted or simplified.

Figure 15:
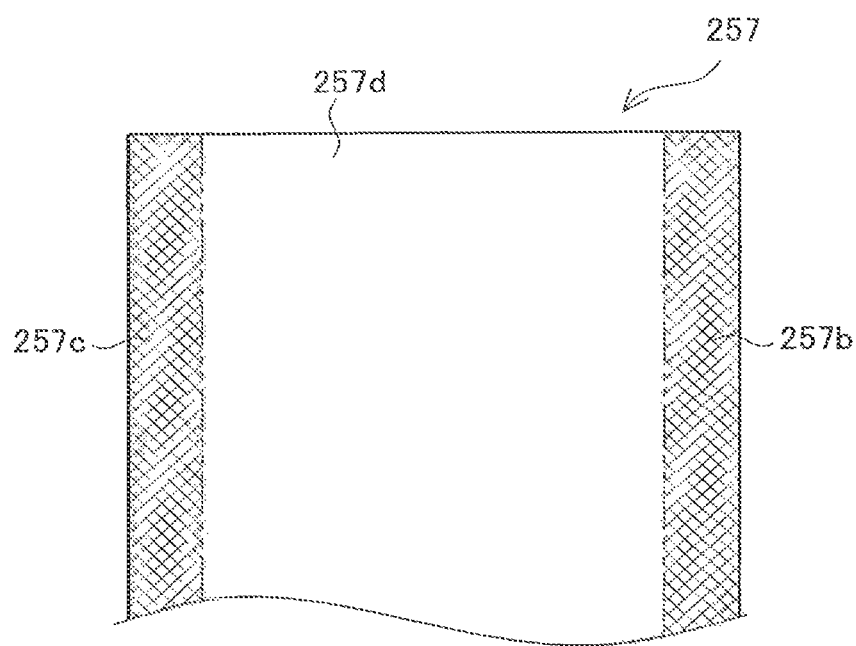
FIG. 15 is a top view of a separator in the second embodiment.

Similarly to the first embodiment, a separator 257 of the second embodiment is composed of a polypropylene-polyethylene-polypropylene trilaminar composite porous sheet and has a strip shape (see FIG. 15). The separator 257 has a first end 257b (indicated by hatching in FIG. 15) located at one end (right end in FIG. 15) with respect to the width direction, a second end 257c (indicated by hatching in FIG. 15) located at the other end (left end in FIG. 15), and an intermediate portion 257d located between the first end 257b and the second end 257c. It should be noted that the lateral direction of FIG. 15 corresponds to the width direction of the separator 257 and the vertical direction of FIG. 15 corresponds to the longitudinal direction of the separator 157.

Figure 14:
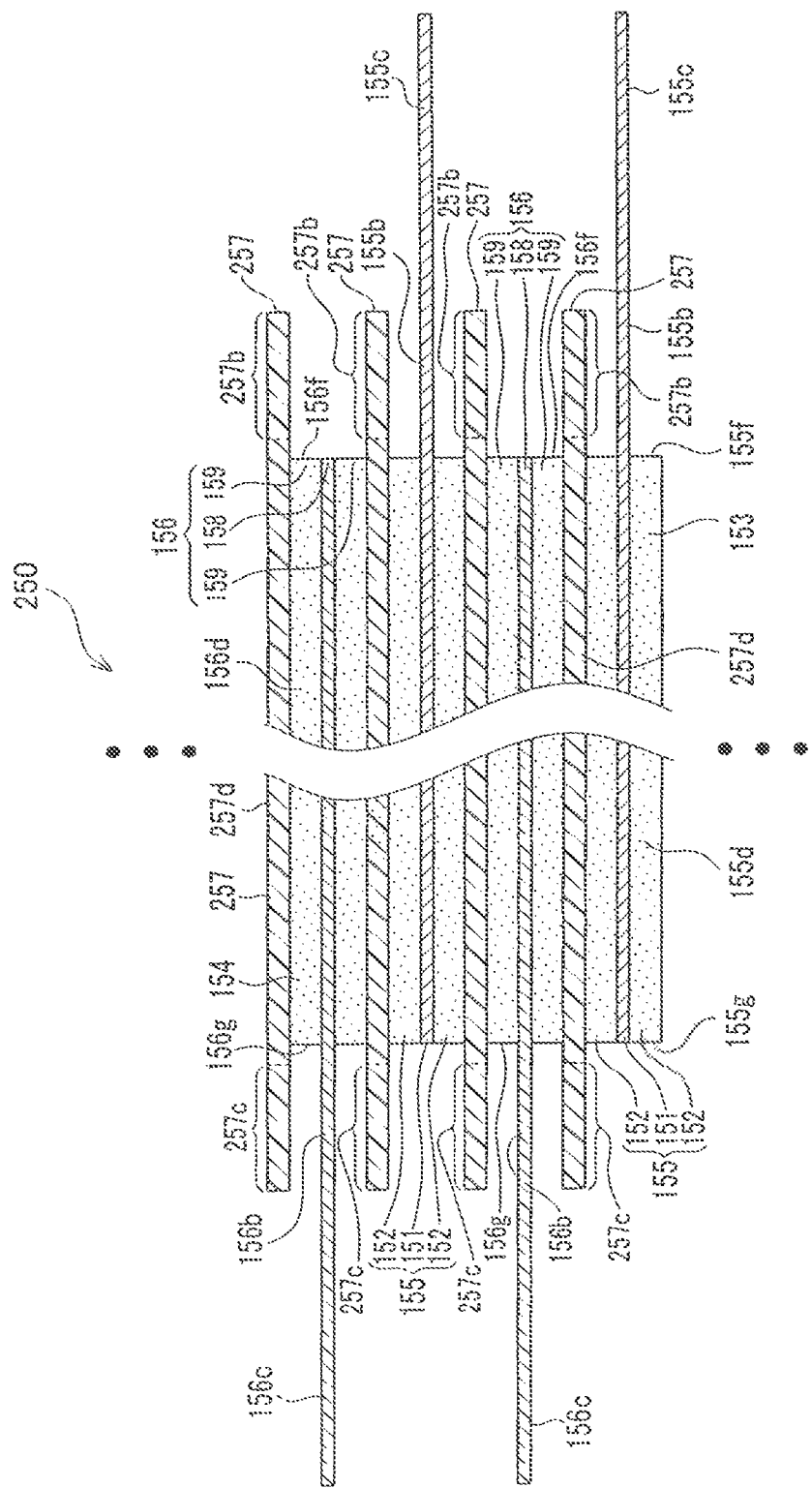
FIG. 14 is a cross sectional view of an electrode body in the second embodiment, taken along the line E-E in FIG. 3.

As shown in FIG. 14, in an electrode body 250 of the second embodiment, the first end 257b of the separator 257 is located more interiorly than (located, in FIG. 14, on the left side of) the one positive electrode end 155c with respect to the width direction (lateral direction in FIG. 14), the end 155c being located at one end (right end in FIG. 14) of the positive electrode plate 155 with respect to the width direction. In other words, the one positive electrode end 155c is located more exteriorly than (located, in FIG. 14, on the right side of) the first end 257b of the separator 257 with respect to the width direction. This one positive electrode end 155c is constituted by the uncoated positive electrode portion 155b (or a part thereof) of the positive electrode plate 155. Therefore, the second embodiment is also configured such that the positive electrode plate 155 and the positive terminal 120 can be electrically connected to each other by welding the one positive electrode end 155c to the positive current collecting portion 122 of the positive terminal 120 (see FIG. 3).

The second end 257c of the separator 257 is located more interiorly than (located closer to the center of the electrode body 250 than) the other negative electrode end 156c is, with respect to the width direction (lateral direction in FIG. 14), the end 156c being located at the other end (left end in FIG. 14) of the negative electrode plate 156 with respect to the width direction. In other words, the other negative electrode end 156c is located more exteriorly than (is more distant from the center of the electrode body 250 than) the second end 257c of the separator 257 is, with respect to the width direction. The other negative electrode end 156c is constituted by the uncoated negative electrode portion 156b (or a part thereof) of the negative electrode plate 156. Therefore, the second embodiment is also configured such that the negative electrode plate 156 and the negative terminal 130 can be electrically connected to each other by welding the other negative electrode end 156c to the negative current collecting portion 132 of the negative terminal 130 (see FIG. 3).

In addition, the electrode body 250 of the second embodiment is configured as shown in FIG. 14. In this figure, the first end 257b of the separator 257 is located more exteriorly than (located, in FIG. 14, on the right side of) the one end 155f of the coated positive electrode portion 155d of the positive electrode plate 155 and located more exteriorly than (located, in FIG. 14, on the right side of) the one end 156f (that corresponds to the one end of the negative electrode plate 156) of the coated negative electrode portion 156d of the negative electrode plate 156, with respect to the width direction (lateral direction in FIG. 14).

In addition, in the second embodiment, the first end 257b of the separator 257 is thermally shrunken by heating beforehand. More concretely, the first end 257b of the separator 257 is thermally shrunken by heating to 200° C. in the course of manufacturing the electrode body 250 (i.e., thermal treatment step) as described later.

Further, the second end 257c of the separator 257 is located more exteriorly than (located, in FIG. 14, on the left side of) the other end 155g (which corresponds to the other end of the positive electrode plate 155) of the coated positive electrode portion 155d of the positive electrode plate 155 and located more exteriorly than (located, in FIG. 14, on the left side of) the other end 156g of the coated negative electrode portion 156d of the negative electrode plate 156, with respect to the width direction (lateral direction in FIG. 14).

In addition, in the second embodiment, the second end 257c of the separator 257 is thermally shrunken by heating beforehand. More concretely, the second end 257c of the separator 257 is thermally shrunken by heating to 200° C. in the course of manufacturing the electrode body 250 (i.e., thermal treatment step) as described later.

Since the non-aqueous electrolyte secondary battery 200 of the second embodiment has the above-described electrode body 250, it is possible to prevent "the undesirable electric short circuit caused by the contact between the positive electrode plate 155 and the negative electrode plate 156 at the widthwise ends (the lateral ends of the coated positive electrode portion 155d and the coated negative electrode portion 156d in FIG. 14) due to heat shrinkage of the separator 257 in the width direction (lateral direction in FIG. 14)".

Concretely, since the first end 257b and second end 257c of the separator 257 are thermally shrunken by heating beforehand, they do not thermally shrink any more in the width direction even if the temperature of the non-aqueous electrolyte secondary battery 200 rises to a temperature (e.g., 150° C.) that causes heat shrinkage of the separator 257. More specifically, the first end 257b of the separator 257 can be prevented from shrinking inwardly in the width direction (to the left in FIG. 14). Also, the second end 257c can be prevented from shrinking inwardly in the width direction (to the right in FIG. 14).

This enables it to prevent "the undesirable contact between the one end 155f of the coated positive electrode portion 155d and the one end 156f of the coated negative electrode portion 156d which contact is caused by the first end 257b of the separator 257 getting into the interface between the positive electrode plate 155 (coated positive electrode portion 155d) and the negative electrode plate 156 (coated negative electrode portion 156d)". This further enables it to prevent "the undesirable contact between the other end 155g of the coated positive electrode portion 155d and the other end 156g of the coated negative electrode portion 156d which contact is caused by the second end 257c of the separator 257 getting into the interface between the positive electrode plate 155 (coated positive electrode portion 155d) and the negative electrode plate 156 (coated negative electrode portion 156d)".

Therefore, in the non-aqueous electrolyte secondary battery 200 of the second embodiment, even if the temperature of the separator 257 rises to a temperature (e.g., 150° C.) that causes heat shrinkage of the separator 257, the separator can be kept present between the positive electrode plate 155 and the negative electrode plate 156 with respect to the width direction (lateral direction in FIG. 14) of the electrode body 250, thereby maintaining the electric insulation between the positive electrode plate 155 and the negative electrode plate 156. Note that since the intermediate portion 257d of the separator 257 is interposed between and pressed by the positive electrode plate 155 (coated positive electrode portion 155d) and the negative electrode plate 156 (coated negative electrode portion 156d), the intermediate portion 257d is unlikely to shrink in the width direction even if the temperature of the separator 257 rises to a temperature (e.g., 150° C.) that causes heat shrinkage of the separator 257.

Next, the process of manufacturing the non-aqueous electrolyte secondary battery 200 will be explained.

First, the positive electrode plate 155, having the positive electrode mixture layers 152 applied to the surfaces of the strip-shaped positive current collector 151 as shown in FIGS. 7 and 8, is prepared. Then, the negative electrode plate 156, having the negative electrode mixture layers 159 applied to the surfaces of the strip-shaped negative current collector 158 as shown in FIGS. 9 and 10, is prepared.

In the thermal treatment step, the widthwise ends (the first end 257b and the second end 257c) of the separator 257 are thermally shrunken by heating.

Figure 16:
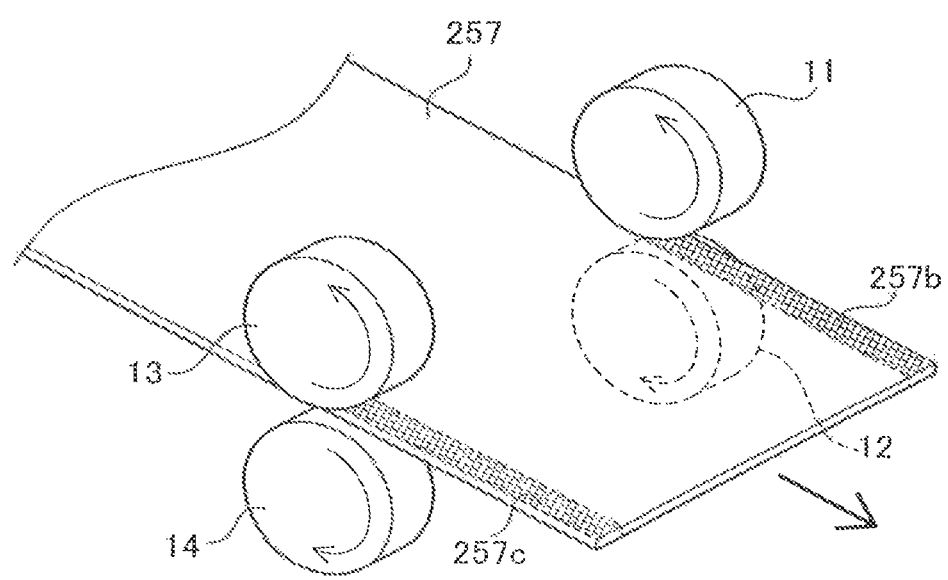
FIG. 16 is an explanatory view showing a thermal treatment step in the second embodiment.

Concretely, as shown in FIG. 16, the first end 257b of the separator 257 is pinched in its thickness direction by heat rollers 11 and 12 heated to 200° C. whereas the second end 257c of the separator 257 is pinched in its thickness direction by heat rollers 13, 14 heated to 200° C., and the separator 257 is moved in its longitudinal direction while the heat rollers 11 to 14 being rotated. Thereby, the first end 257b and second end 257c of the separator 257 can be thermally shrunken. In this way, the separator 257 having the thermally shrunken first end 257b and second end 257c can be manufactured.

Figure 17:
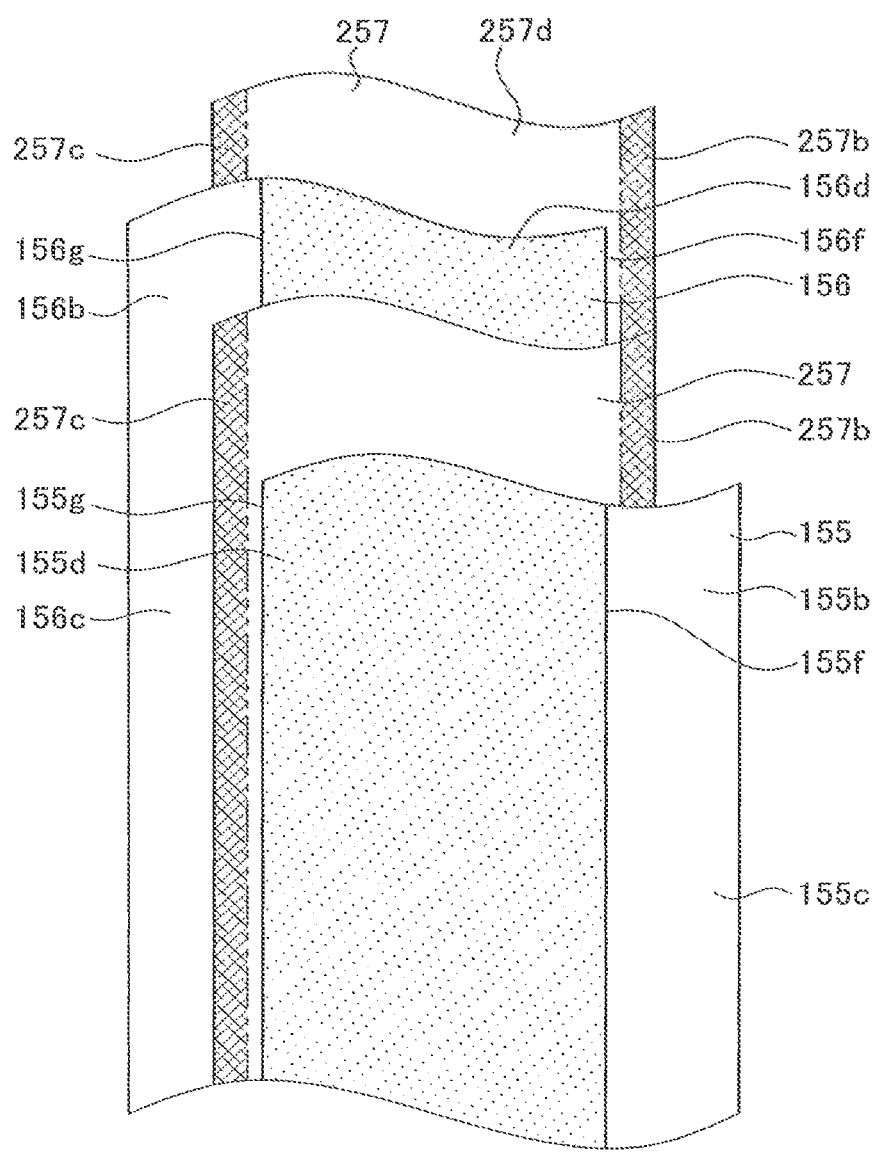
FIG. 17 is an explanatory view showing a process of manufacturing the electrode body in the second embodiment.

Next, the positive electrode plate 155, the negative electrode plate 156 and the separator 157 are wound into a flat roll such that they overlap one another as shown in FIG. 17, whereby the electrode body 150 is formed (see FIG. 5). More specifically, the positive electrode plate 155, the negative electrode plate 156 and the separator 257 are arranged as follows when they are rolled up. With respect to the width direction (lateral direction in FIG. 17), the first end 257b of the separator 257 is located more interiorly than (located, in FIG. 17, on the left side of) the one positive electrode end 155c of the positive electrode plate 155; located more exteriorly than (located, in FIG. 17, on the right side of) the one end 155f of the coated positive electrode portion 155d of the positive electrode plate 155; and located more exteriorly than (located, in FIG. 17, on the right side of) the one end 156f of the coated negative electrode portion 156d of the negative electrode plate 156. Further, with respect to the width direction, the second end 257c of the separator 257 is located more interiorly than (located, in FIG. 17, on the right side of) the other negative electrode end 156c of the negative electrode plate 156; located more exteriorly than (located, in FIG. 17, on the left side of) the other end 155g of the coated positive electrode portion 155d of the positive electrode plate 155; and located more exteriorly than (located, in FIG. 17, on the left side of) the other end 56g of the coated negative electrode portion 156d of the negative electrode plate 156.

Then, the positive current collecting portion 122 of the positive terminal 120 is welded to the upper end of the one positive electrode end 155c of the electrode body 250 (see FIG. 3). The negative current collecting portion 132 of the negative terminal 130 is welded to the upper end of the other negative electrode end 156c of the electrode body 250. After this electrode body 250 is accommodated within the rectangular storage section 111, the opening of the rectangular storage section 111 is closed with the lid 112. Thereafter, the lid 112 is welded to the rectangular storage section 111. Subsequently, a non-aqueous electrolytic solution is poured into the rectangular storage section III through the pouring port (not shown) formed in the lid 112 (at that time, the electrode body 250 is impregnated with the non-aqueous electrolytic solution). The pouring port is then sealed and the manufacture of the non-aqueous electrolyte secondary battery 200 of the second embodiment is accordingly completed.

(Third Embodiment)

A non-aqueous electrolyte secondary battery 300 constructed according to the third embodiment does not differ from the non-aqueous electrolyte secondary battery 100 of the first embodiment except the electrode body. Therefore, the points different from the first embodiment are mainly discussed herein while explanation of the similar or identical points is omitted or simplified.

Figure 18:
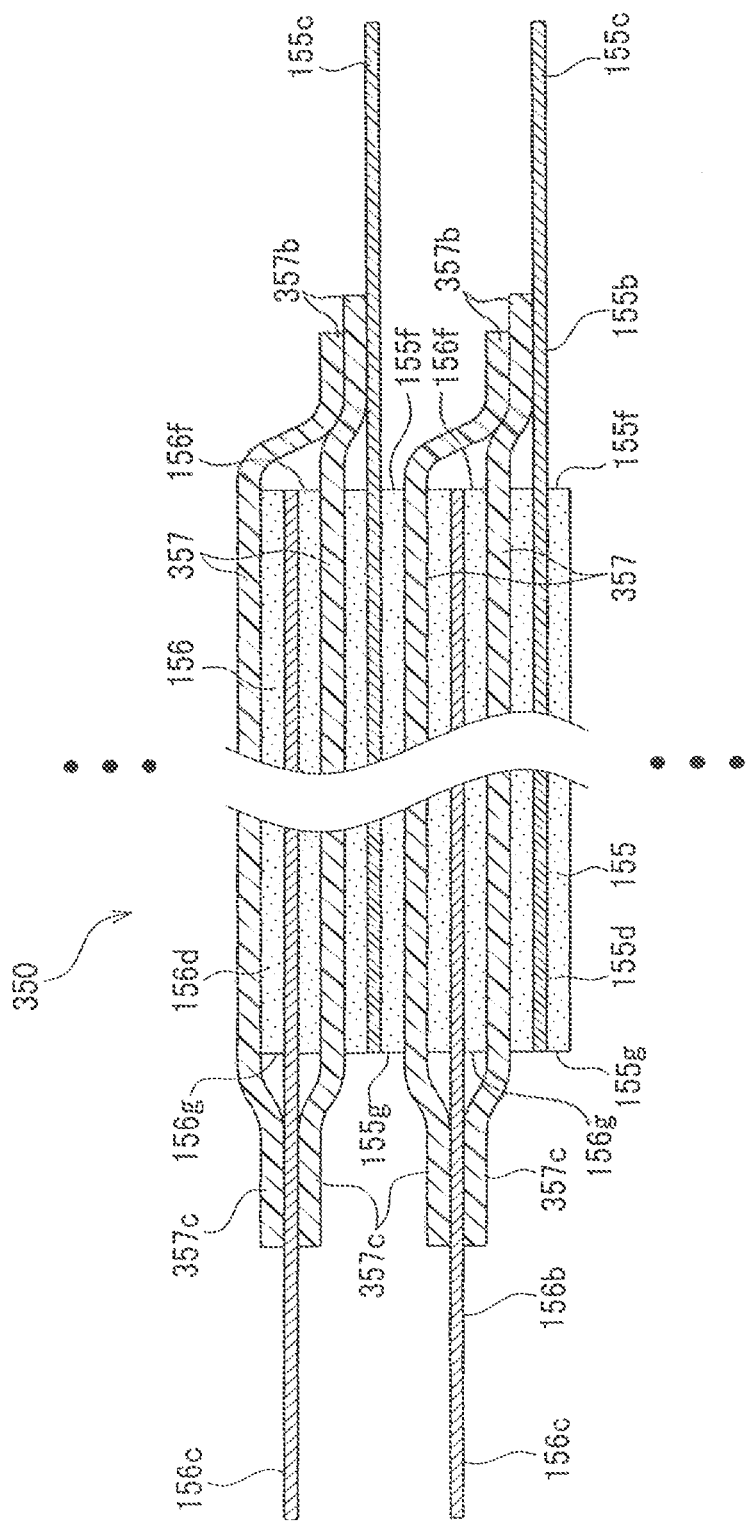
FIG. 18 is a cross sectional view of an electrode body in the third embodiment, taken along the line E-E in FIG. 3.

As shown in FIG. 18, in an electrode body 350 of the third embodiment, a first end 357b of a separator 357 is located more interiorly than (located, in FIG. 18, on the left side of) the one positive electrode end 155c with respect to the width direction (lateral direction in FIG. 18) which end 155c is located at one end (right end in FIG. 18) of the positive electrode plate 155 with respect to the width direction. In other words, the one positive electrode end 155c is located more exteriorly than (located, in FIG. 18, on the right side of) the first end 357b of the separator 357 with respect to the width direction. This one positive electrode end 155c is constituted by the uncoated positive electrode portion 155b (or a part thereof) of the positive electrode plate 155. Therefore, the third embodiment is also configured such that the positive electrode plate 155 and the positive terminal 120 can be electrically connected to each other by welding the one positive electrode end 155c to the positive current collecting portion 122 of the positive terminal 120 (see FIG. 3).

A second end 357c of the separator 357 is located more interiorly than (located closer to the center of the electrode body 350 than) the other negative electrode end 156c is, with respect to the width direction (lateral direction in FIG. 18), the end 156c being located at the other end (left end in FIG. 18) of the negative electrode plate 156 with respect to the width direction. In other words, the other negative electrode end 156c is located more exteriorly than (is more distant from the center of the electrode body 350 than) the second end 357c of the separator 357 is, with respect to the width direction. The other negative electrode end 156c is constituted by the uncoated negative electrode portion 156b (or a part thereof) of the negative electrode plate 156. Therefore, the third embodiment is also configured such that the negative electrode plate 156 and the negative terminal 130 can be electrically connected to each other by welding the other negative electrode end 156c to the negative current collecting portion 132 of the negative terminal 130 (see FIG. 3).

In addition, the electrode body 350 of the third embodiment is configured as shown in FIG. 18. In this figure, the first end 357b of the separator 357 is located more exteriorly than (located, in FIG. 18, on the right side of) the one end 155f of the coated positive electrode portion 155d of the positive electrode plate 155 and located more exteriorly than (located, in FIG. 18, on the right side of) the one end 156f (that corresponds to the one end of the negative electrode plate 156) of the coated negative electrode portion 156d of the negative electrode plate 156, with respect to the width direction (lateral direction in FIG. 18).

In addition, in the third embodiment, the first end 357b of the separator 357 is heat-welded to a portion of the positive electrode plate 155, the portion being opposed to the separator 357 in the thickness direction (this portion is located under the separator 357 in FIG. 18). Specifically, the first end 357b of the separator 357 is heat-welded to the portion (uncoated positive electrode portion 155b) of the positive electrode plate 155 which portion is opposed to the separator 357 in the thickness direction, as described later in the process of manufacturing the electrode body 350. In FIG. 18, the separator 357 in contact with the upper surface of the negative electrode plate 156 (coated negative electrode portion 156d) is heat-welded to the uncoated positive electrode portion 155b, with the first end 357b being integral with another first end 357b located thereunder.

Additionally, in the third embodiment, the first end 357b of the separator 357 is heat-welded to the uncoated positive electrode portion 155b (or a part thereof). Therefore, the first end 357b of the separator 357 can be properly adhered (welded) to the positive electrode plate 155.

Further, the second end 357c of the separator 357 is located more exteriorly than (located, in FIG. 18, on the left side of) the other end 155g (which corresponds to the other end of the positive electrode plate 155) of the coated positive electrode portion 155d of the positive electrode plate 155 and located more exteriorly than (located, in FIG. 8, on the left side of) the other end 156g of the coated negative electrode portion 156d of the negative electrode plate 156, with respect to the width direction (lateral direction in FIG. 18).

Additionally, in the third embodiment, the second end 357c of the separator 357 is heat-welded to a portion of the negative electrode plate 156, the portion being opposed to the separator 357 in the thickness direction (in the vertical direction in FIG. 18). Specifically, the second end 357c of the separator 357 is heat-welded to the portion (uncoated negative electrode portion 156b) of the negative electrode plate 156 which portion is opposed to the separator 357 in the thickness direction, as described later in the process of manufacturing the electrode body 350.

In the third embodiment, the second end 357c of the separator 357 is heat-welded to the uncoated negative electrode portion 156b (or a part thereof). Therefore, the second end 357c of the separator 357 can be properly adhered (welded) to the negative electrode plate 156.

Since the non-aqueous electrolyte secondary battery 300 of the third embodiment has the above-described electrode body 350, it is possible to prevent "the undesirable electric short circuit caused by the contact between the positive electrode plate 155 and the negative electrode plate 156 at the widthwise ends (the lateral ends of the coated positive electrode portion 155d and the coated negative electrode portion 156d in FIG. 18) due to heat shrinkage of the separator 357 in the width direction (lateral direction in FIG. 18)".

Specifically, even if the temperature of the non-aqueous electrolyte secondary battery 300 rises to a temperature (e.g., 150° C.) that causes heat shrinkage of the separator 357, the first end 357b and second end 357c of the separator 357 are unlikely to thermally shrink further in the width direction because they have already been thermally shrunken by heating at the time of heat-welding.

In addition, since the first end 357b of the separator 357 is adhered (heat-welded) to the portion of the positive electrode plate 155 which portion is opposed to the separator in the thickness direction, the inward displacement of the first end 357b of the separator 357 in the width direction can be prevented even if it is forced by heat shrinkage to move inwardly in the width direction (to the left in FIG. 18). This enables it to prevent "the undesirable contact between the one end 155f of the coated positive electrode portion 155d and the one end 156f of the coated negative electrode portion 156d which contact is caused by the first end 357b of the separator 357 getting into the interface between the positive electrode plate 155 (coated positive electrode portion 155d) and the negative electrode plate 156 (coated negative electrode portion 156d).

In addition, since the second end 357c of the separator 357 is adhered (heat-welded) to the portion of the negative electrode plate 156 which portion is opposed to the separator 357 in the thickness direction, the inward displacement of the second end 357c of the separator 357 in the width direction can be prevented even if it is forced by heat shrinkage to move inwardly in the width direction (to the right in FIG. 18). This enables it to prevent "the undesirable contact between the other end 155g of the coated positive electrode portion 155d and the other end 156g of the coated negative electrode portion 156d which contact is caused by the second end 357c of the separator 357 getting into the interface between the positive electrode plate 155 (coated positive electrode portion 155d) and the negative electrode plate 156 (coated negative electrode portion 156d).

Therefore, in the non-aqueous electrolyte secondary battery 300 of the third embodiment, even if the temperature of the separator 357 rises to a temperature (e.g., 150° C.) that causes heat shrinkage of the separator 357, the separator can be kept present between the positive electrode plate 155 and the negative electrode plate 156 with respect to the width direction (lateral direction in FIG. 18) of the electrode body 350, thereby maintaining the electric insulation between the positive electrode plate 155 and the negative electrode plate 156.

Next, the process of manufacturing the non-aqueous electrolyte secondary battery 300 will be explained.

Firstly, the positive electrode plate 155, having the positive electrode mixture layers 152 applied to the surfaces, respectively, of the strip-shaped positive current collector 151 as shown in FIGS. 7 and 8, is prepared. Then, the negative electrode plate 156, having the negative electrode mixture layers 159 applied to the surfaces, respectively, of the strip-shaped negative current collector 158 as shown in FIGS. 9 and 10, is prepared. Then, the strip-shaped separator 357, composed of a polypropylene-polyethylene-polypropylene trilaminar composite porous sheet, is prepared.

Figure 19:
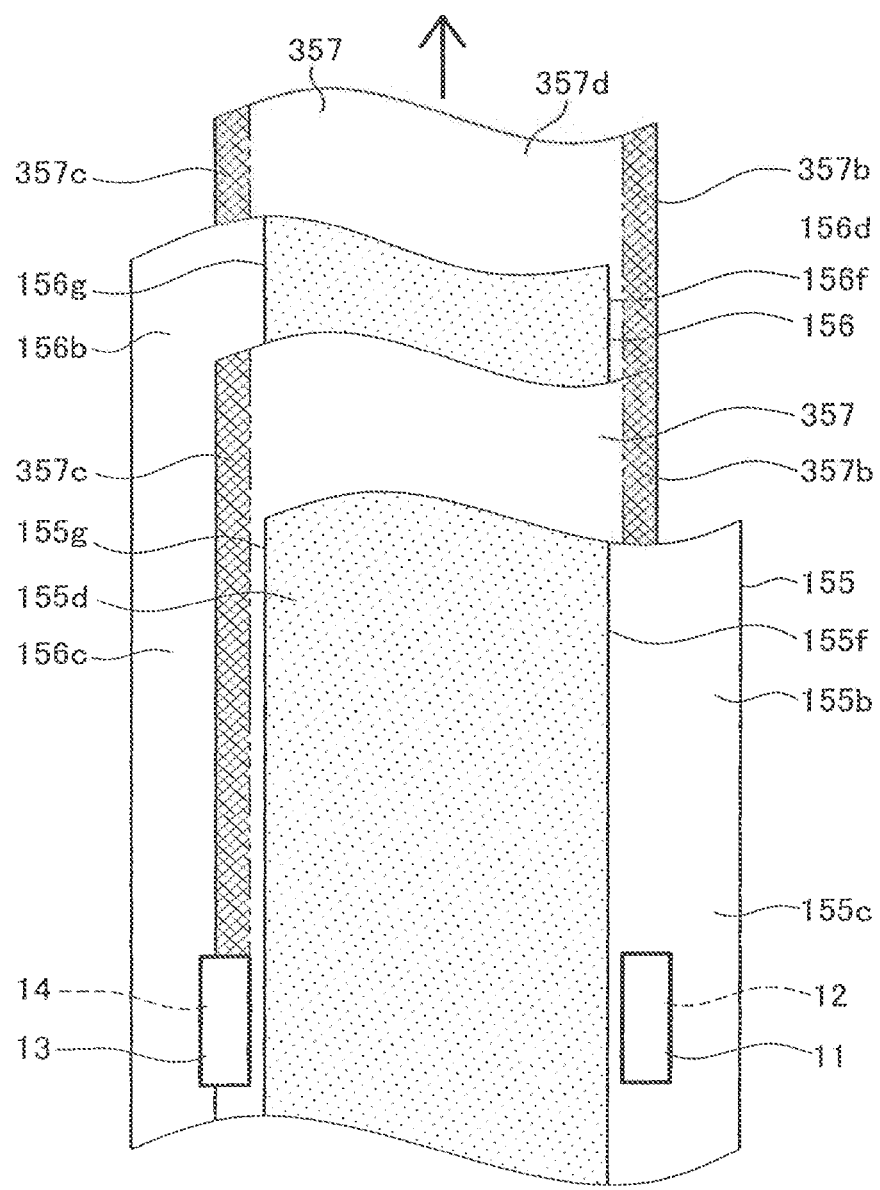
FIG. 19 is an explanatory view showing a process of manufacturing the electrode body in the third embodiment.

Next, the positive electrode plate 155, the negative electrode plate 156 and the separator 357 are stacked as illustrated in FIG. 19. In this case, the positive electrode plate 155, the negative electrode plate 156 and the separator 357 are arranged as follows. With respect to the width direction (lateral direction in FIG. 19), the first end 357b of the separator 357 is located more interiorly than (located, in FIG. 19, on the left side of) the one positive electrode end 155c of the positive electrode plate 155; located more exteriorly than (located, in FIG. 19, on the right side of) the one end 155f of the coated positive electrode portion 155d of the positive electrode plate 155; and located more exteriorly than (located, in FIG. 19, on the right side of) the one end 156f of the coated negative electrode portion 156d of the negative electrode plate 156. Further, with respect to the width direction, the second end 357c of the separator 357 is located more interiorly than (located, in FIG. 19, on the right side of) the other negative electrode end 156c of the negative electrode plate 156; located more exteriorly than (located, in FIG. 19, on the left side of) the other end 155g of the coated positive electrode portion 155d of the positive electrode plate 155; and located more exteriorly than (located, in FIG. 19, on the left side of) the other end 156g of the coated negative electrode portion 156d of the negative electrode plate 156.

With the positive electrode plate 155, the negative electrode plate 156 and the separator 357 being in such an overlapped condition, the first end 357b of the separator 357 and the uncoated positive electrode portion 155b of the positive electrode plate 155 are pinched (held in pressure contact) in the thickness direction by the heat rollers 11 and 12 heated to 200° C., while the second end 357c of the separator 357 and the uncoated negative electrode portion 156b of the negative electrode plate 156 are pinched (held in pressure contact) in the thickness direction by the heat rollers 13 and 14 heated to 200° C. Then, the positive electrode plate 155, the negative electrode plate 156 and the separator 357 are moved in the longitudinal direction (upwardly in FIG. 19), while the heat rollers 11 to 14 being rotated. Note that the heat roller 12 is positioned on the back of the heat roller 11 (on the farther side when viewed in a direction perpendicular to the plane of the drawing) in FIG. 19, whereas the heat roller 14 is positioned on the back of the heat roller 13 (on the farther side when viewed in a direction perpendicular to the plane of the drawing) in FIG. 19.

This enables it to heat-weld the first end 357b of the separator 357 to the portion (uncoated positive electrode portion 155b) of the positive electrode plate 155 which portion is opposed to the separator 357 in the thickness direction. Further, the second end 357c of the separator 357 can be heat-welded to the portion (uncoated negative electrode portion 156b) of the negative electrode plate 156 which portion is opposed to the separator 357 in the thickness direction. After heat-welding, they (positive electrode plate 155, negative electrode plate 156 and separator 357) are wound into a flat roll thereby to form the electrode body 350 (see FIG. 5).

In the third embodiment, an adhesive agent (e.g., polyolefin-based adhesive agents) is applied beforehand to the portion (uncoated positive electrode portion 155b) of the positive electrode plate 155 which portion is opposed to the first end 357b of the separator 357 in the thickness direction. Also, an adhesive agent (e.g., polyolefin-based adhesive agents) is applied beforehand to the portion (uncoated negative electrode portion 156b) of the negative electrode plate 156 which portion is opposed to the second end 357c of the separator 357 in the thickness direction.

Then, the positive current collecting portion 122 of the positive terminal 120 is welded to the upper end of the one positive electrode end 155c of the electrode body 350 (see FIG. 3). The negative current collecting portion 132 of the negative terminal 130 is welded to the upper end of the other negative electrode end 156c of the electrode body 350. After this electrode body 350 is accommodated within the rectangular storage section 111, the opening of the rectangular storage section 111 is closed with the lid 112. Thereafter, the lid 112 is welded to the rectangular storage section 111. Subsequently, a non-aqueous electrolytic solution is poured into the rectangular storage section 111 through the pouring port (not shown) formed in the lid 112 (at that time, the electrode body 350 is impregnated with the non-aqueous electrolytic solution). The pouring port is then sealed and the manufacture of the non-aqueous electrolyte secondary battery 300 of the third embodiment is accordingly completed.

(Heating Test)

Five samples were prepared for each of the non-aqueous electrolyte secondary batteries 100 to 300 of the first to third embodiments. Also, five non-aqueous electrolyte secondary batteries were prepared as a comparative example which differed from the non-aqueous electrolyte secondary battery 200 of the second embodiment in that the first end and second end of the separator had not undergone preliminary heat shrinkage (that is, the thermal treatment step had not been applied to the first and second ends). A heating test was conducted on these batteries (twenty batteries in total) to check whether internal electric short circuit would occur.

First, the capacities of the batteries of the first to third embodiments and the comparative example (twenty batteries in total) were measured at a temperature of 25° C. prior to the heating test. Specifically, each battery was charged with a constant current of 1 C (5.5 A) until the battery voltage reached 4.2V and then subsequently was charged while keeping the battery voltage at 4.2V until the current reached 0.1 C (0.55 A). Thus, the non-aqueous electrolyte secondary battery 100 was charged up to SOC 100%.

It should be noted that 1 C is the value of current required to complete a constant current discharge of the rated capacity (nominal capacity) of a battery in one hour. The rated capacities (nominal capacities) of the non-aqueous electrolyte secondary batteries 100 to 300 and the non-aqueous electrolyte secondary batteries of the comparative example are 5.5 Ah, and therefore 1 C=5.5 A.

SOC is the abbreviation of "State of Charge" (=charging rate).

Thereafter, each battery was discharged with a constant current of 1 C (5.5 A) until the battery voltage reached 2.5V. Thus, each battery was discharged down to SOC 0%. The quantity of electricity discharged at that time was measured as the capacity of each battery, and the average (average capacity) of the batteries was calculated for each of the first to third embodiments and the comparative example. Table 1 shows the result.

As shown in Table 1, the average capacity of the batteries of the first embodiment (the average of the capacities of the five sample batteries prepared for the first embodiment) was 5.48 Ah. The average capacity of the batteries of the second embodiment was 5.50 Ah. The average capacity of the batteries of the third embodiment was 5.47 Ah. The average capacity of the batteries of the comparative example was 5.52 Ah.

Next, a heating test was conducted on each battery. Specifically, the SOC of each battery was set to 80% (battery voltage=3.8V) and all the batteries were placed in the test room of heating test equipment. Then, the interior temperature of the test room was raised 5° C. per minute, thereby setting the interior temperature of the test room to 160° C. Thereafter, the internal temperature of the test room was kept at 160° C. and each battery was left to stand in the test room having a temperature of 160° C. for 30 minutes. In the mean time, the temperature of each battery was measured to obtain the maximum temperature the battery had reached. It should be noted that 160° C. is a temperature that causes heat shrinkage of the separator.

Further, the voltage of each battery was measured during the heating test and the battery voltage after the heating test was obtained. Incidentally, in a battery in which internal short circuit has occurred (i.e., the positive electrode plate and the negative electrode plate have come into contact with each other at the widthwise ends of the separator), the battery voltage generally drops to 0V. It is therefore conceivable that, in the batteries whose voltage dropped to 0V after the heating test, the positive electrode plate and the negative electrode plate had come into contact with each other at the widthwise ends (first and second ends) of the separator owing to heat shrinkage of the separator so that internal short circuit had occurred. Table 1 shows the result.

As shown in Table 1, the voltages of all the batteries of the comparative examples dropped to 0V after the heating test. The maximum temperature that they reached during the heating test was 210° C. which was 50° C. higher than the interior temperature (160° C.) of the test room. It can be assumed from this result that, in the batteries of the comparative examples, the positive electrode plate and the negative electrode plate came into contact with each other at the widthwise ends (first and second ends) of the separator owing to heat shrinkage of the separator, causing internal short circuit. The heat generation of the batteries is thought to be accelerated by this internal short circuit so that the temperature of the batteries is elevated to 210° C.

The batteries of the first to third embodiments, on the other hand, are all kept at a voltage of 3.8V. The maximum temperature that they reached during the heating test was 160° C. which was the same as the interior temperature (160° C.) of the test room. It is understood from this result that the batteries of the first to third embodiments could maintain the separator interposed between the positive electrode plate and the negative electrode plate with respect to

TABLE 1

| | AVERAGE CAPACITY (Ah) | BATTERY VOLTAGE (V) | MAXIMUM TEMPERATURE (° C.) | NUMBER OF SHORTED BATTERIES |
|---|---|---|---|---|
| COMPARATIVE EXAMPLE | 5.52 | 0 | 210 | 5 |
| EMBODIMENT 1 | 5.48 | 3.8 | 160 | 0 |
| EMBODIMENT 2 | 5.50 | 3.8 | 160 | 0 |
| EMBODIMENT 3 | 5.47 | 3.8 | 160 | 0 | the width direction of the electrode body, keeping the electric insulation between the positive and negative electrode plates even though they underwent the heating test (in which the batteries were heated to a temperature that causes heat shrinkage of the separator). That is, "the undesirable electric short circuit caused by the contact between the positive electrode plate and the negative electrode plate at the widthwise ends due to heat shrinkage of the separator in the width direction" can be prevented in the first to third embodiments. The reason for this is as explained earlier in the description of each embodiment.

The above explanations are provided for the first to third embodiments, but do not limit the invention thereto. The present invention may be embodied in other specific forms without departing from the essential characteristics thereof.

EXPLANATION OF REFERENCE SIGNS 100, 200, 300 Non-aqueous electrolyte secondary battery
110 Battery case
150, 250, 350 Electrode body (Electrode body for non-aqueous electrolyte secondary battery)
155 Positive electrode plate
155b Uncoated positive electrode portion
155c One positive electrode end
155d Coated positive electrode portion
151 Positive current collector
152 Positive electrode mixture layer
156 Negative electrode plate
156b Uncoated negative electrode portion
156c Other negative electrode end
158 Negative current collector
159 Negative electrode mixture layer
157, 257, 357 Separator
157b, 257b, 357b First end of separator
157c, 257c, 357c Second end of separator
157d, 257d, 357d Intermediate portion of separator

The invention claimed is:

1. An electrode body for use in non-aqueous electrolyte secondary battery, the electrode body comprising a positive electrode plate, a negative electrode plate and a separator interposed between the positive and negative electrode plates, the positive electrode plate, negative electrode plate and separator overlapping one another with their widths oriented in the same direction, wherein the positive electrode plate has a positive current collector and a positive electrode mixture layer applied to a surface of the positive current collector;

the negative electrode plate has a negative current collector and a negative electrode mixture layer applied to a surface of the negative current collector;

the separator has a first end located at one end thereof and a second end located at the other end thereof with respect to a width direction and has an intermediate portion located between the first and second ends;

with respect to the width direction, the first separator end is located more interiorly than one positive electrode end which is located at one end of the positive electrode plate with respect to the width direction; located more exteriorly than one end of a coated positive electrode portion of the positive electrode plate which portion is coated with the positive electrode mixture layer; and located more exteriorly than one end of a coated negative electrode portion of the negative electrode plate which portion is coated with the negative electrode mixture layer, the first separator end being heat-welded to a portion of the positive electrode plate which portion is opposed to the separator in its thickness direction; and with respect to the width direction, the second separator end is located more interiorly than an other negative electrode end which is located at an other end of the negative electrode plate with respect to the width direction; located more exteriorly than an other end of the coated positive electrode portion; and located more exteriorly than an other end of the coated negative electrode portion, the second separator end being heat-welded to a portion of the negative electrode plate which portion is opposed to the separator in its thickness direction.

2. A non-aqueous electrolyte secondary battery comprising the electrode body for use in non-aqueous electrolyte secondary battery set forth in claim 1.

3. The electrode body for use in non-aqueous electrolyte secondary battery according to claim 1, wherein the portion of the positive electrode plate to which the first separator end is heat-welded is at least a part of an uncoated positive electrode portion of the positive electrode plate which portion is not coated with the positive electrode mixture layer, whereas the portion of the negative electrode plate to which the second separator end is heat-welded is at least a part of an uncoated negative electrode portion of the negative electrode plate which portion is not coated with the negative electrode mixture layer.

4. A non-aqueous electrolyte secondary battery comprising the electrode body for use in non-aqueous electrolyte secondary battery set forth in claim 3.

* * * * *